US009794519B2

(12) United States Patent
Takahashi

(10) Patent No.: US 9,794,519 B2
(45) Date of Patent: Oct. 17, 2017

(54) POSITIONING APPARATUS AND POSITIONING METHOD REGARDING A POSITION OF MOBILE OBJECT

(75) Inventor: Katsuhiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1149 days.

(21) Appl. No.: 13/995,918

(22) PCT Filed: Dec. 16, 2011

(86) PCT No.: PCT/JP2011/079954
§ 371 (c)(1),
(2), (4) Date: Jun. 19, 2013

(87) PCT Pub. No.: WO2012/086821
PCT Pub. Date: Jun. 28, 2012

(65) Prior Publication Data
US 2013/0271607 A1    Oct. 17, 2013

(30) Foreign Application Priority Data
Dec. 20, 2010    (JP) ................. 2010-282959

(51) Int. Cl.
*H04N 7/18*    (2006.01)
*G01S 5/16*    (2006.01)
(Continued)

(52) U.S. Cl.
CPC ............... *H04N 7/18* (2013.01); *G01C 21/20* (2013.01); *G01C 21/30* (2013.01);
(Continued)

(58) Field of Classification Search
CPC ....... G09G 2370/045; G09G 2370/047; G09G 5/006; G01C 21/20; G01C 21/30;
(Continued)

(56) References Cited

U.S. PATENT DOCUMENTS

2008/0019564 A1    1/2008  Murata et al.
2008/0158361 A1*   7/2008  Itoh .................. G08B 13/19602
                                                    348/155
(Continued)

FOREIGN PATENT DOCUMENTS

JP         10-160463 A     6/1998
JP       2005-326168 A    11/2005
(Continued)

OTHER PUBLICATIONS

Mitsutaka Susuki et al., "Extrinsic Camera Parameter Estimation from a Still Image Based on Feature Landmark Database", The Virtual Reality Society of Japan, Academic Journal, 2008, vol. 13, No. 2, pp. 161-170.

(Continued)

*Primary Examiner* — Jessica M Prince
(74) *Attorney, Agent, or Firm* — McGinn IP Law Group, PLLC

(57) ABSTRACT

The present invention provides a positioning apparatus which enables output of accurate position information related to a mobile object. The positioning apparatus, which is mounted in a mobile object, stores therein, in a mutually correlated manner, a first image feature at a first spot where a mobile object exists, approximate position information related to the mobile object at the first spot, position information related to a second spot on which the mobile object is predicted to move, and a second feature at the second spot; selects a plurality of the second features on the basis of the approximate position information; calculates a plurality of relative position information between the first spot and the respective second spots corresponding to the plurality of second features; determines consistency among the plurality of relative position information; and outputs determinate position information related to the mobile object.

20 Claims, 17 Drawing Sheets

(51) Int. Cl.
*G01C 21/20* (2006.01)
*G01C 21/30* (2006.01)
*G01C 21/36* (2006.01)
*G06T 7/73* (2017.01)

(52) U.S. Cl.
CPC ............ *G01C 21/3602* (2013.01); *G01S 5/16* (2013.01); *G06T 7/73* (2017.01); *G06T 2207/10016* (2013.01); *G06T 2207/30252* (2013.01)

(58) Field of Classification Search
CPC .................. G01C 21/3602; G01S 5/16; G06T 2207/10016; G06T 2207/30252; G06T 7/0042; H04N 7/18
USPC .......................................................... 348/148
See application file for complete search history.

(56) References Cited

U.S. PATENT DOCUMENTS

2008/0319640 A1* 12/2008 Fujita ............................ 382/224
2010/0176987 A1* 7/2010 Hoshizaki ............... G01S 19/48
342/357.23

FOREIGN PATENT DOCUMENTS

| JP | 2005326168 | * | 11/2005 |
| JP | 2009-74995 A | | 4/2009 |
| WO | WO 2006/001129 A1 | | 1/2006 |

OTHER PUBLICATIONS

Richard Hartley, 'Multiple View Geometry in Computer Vision', Cambridge University Press, Mar. 2004, Second edition, pp. 257-259 and 290-294.

International Search Report (ISR) (PCT Form PCT/ISA/210) dated Mar. 27, 2012, in PCT/JP2011/079954.

Haruya Kyutoku, et al, 'Detection of Forward Obstacles by Subtraction of Road-Surface between Present and Past In-vehicle Camera Images', Technical Digest of the 15th Symposium on Sensing via Image Information, Society of Academic Study on Sensing via Image Information, Jun. 2009, IS 2-15-1 to IS 2-15-4.

* cited by examiner

Fig.14

| CLOCK TIME | PRESENT IMAGING POSITION | CANDIDATE IMAGING POSITION | | |
|---|---|---|---|---|
| | | 402A | 402B | 402C |
| T-4 | 401K | ANTERIOR | ANTERIOR | POSTERIOR |
| T-3 | 401J | ANTERIOR | ANTERIOR | POSTERIOR |
| T-4 | 401H | ANTERIOR | ANTERIOR | POSTERIOR |
| T-1 | 401G | ANTERIOR | ANTERIOR | POSTERIOR |
| T | 401F | ANTERIOR | POSTERIOR | POSTERIOR |

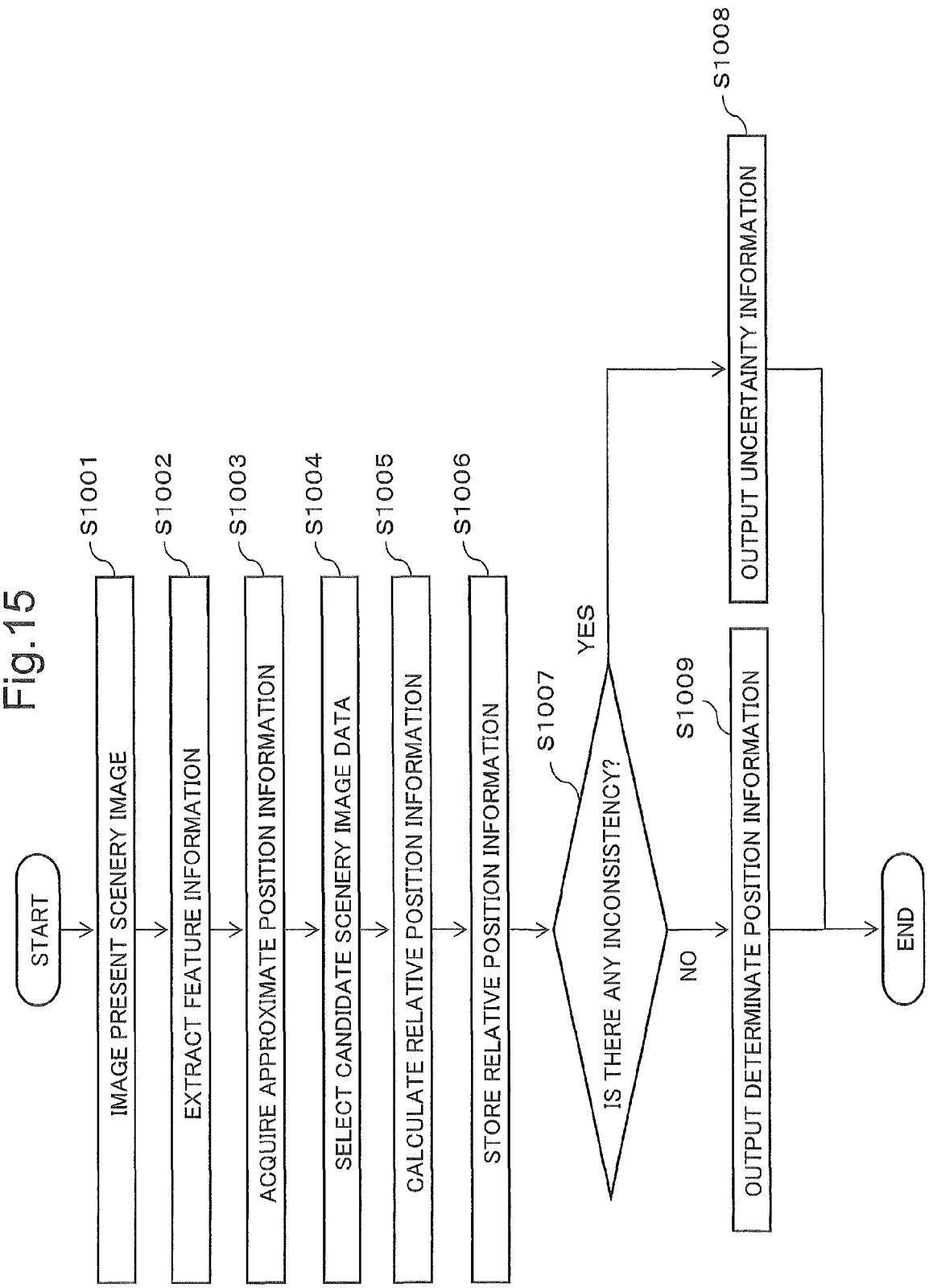

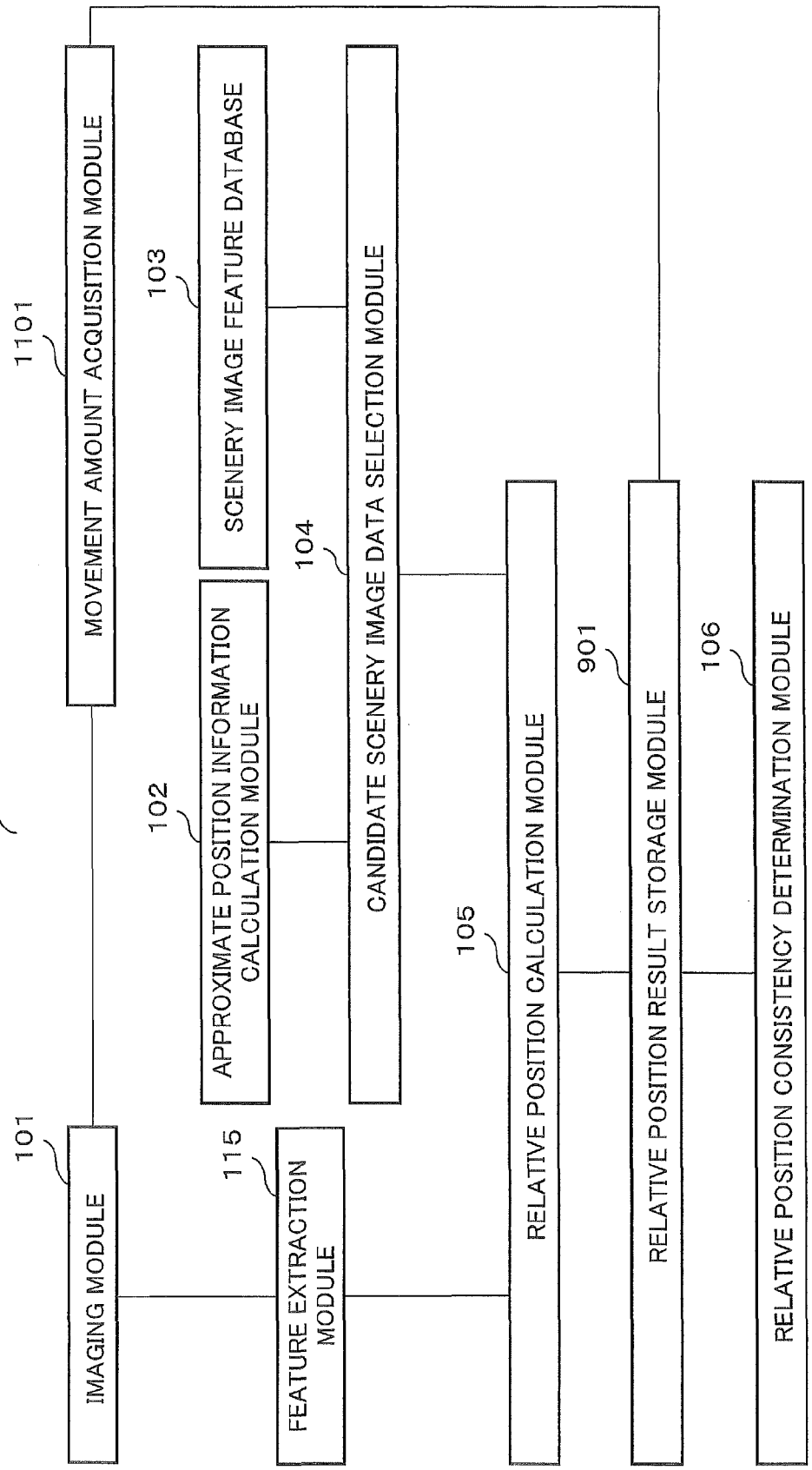

POSITIONING APPARATUS AND POSITIONING METHOD REGARDING A POSITION OF MOBILE OBJECT

TECHNICAL FIELD

The present invention relates to positioning apparatuses and positioning methods, and in particular, it relates to a positioning apparatus and a positioning method which identify a present position of a mobile object on the basis of scenery images having been imaged.

BACKGROUND ART

Various related technologies for identifying positions of a mobile object have been well known.

For example, there is a global positioning system (GPS). The global positioning system allows an in-vehicle receiver to receive radio waves transmitted from GPS satellites. Further, the global positioning system performs positioning on the basis of clock-time differences from the transmissions of the radio waves until the receptions of the radio waves.

In such positioning systems based on radio technologies, there has been a problem that it is impossible to perform positioning at spots where radio waves from a necessary number of transmitting stations cannot be received. Examples of such spots include valleys between buildings and undergrounds. In urban areas or the like, therefore, there sometimes occurs a situation where positioning is unavailable.

There has been disclosed a positioning technology which enables prevention of such a problem, and which is based on a completely different principle. In this positioning technology, the features of scenery images acquired by a camera mounted in a mobile object and the features of scenery images having been stored in advance in a database are collated by using a computational geometry technology. In the positioning technology, a present position of the mobile object is identified on the basis of the collation result.

For example, in patent literature (PTL) 1, there is disclosed a driving support system using the above-described technology. The driving support system disclosed in PTL 1 includes a camera, a car navigation device, an outside-vehicle image reproduction unit and an image comparison unit. The camera performs imaging of external images from inside a vehicle. The car navigation device calculates positions of the vehicle itself. The outside-vehicle image reproduction unit creates outside-vehicle images to be imaged by using a three-dimensional (3D) map on the basis of positions having been calculated by the car navigation device. The image comparison unit compares the images having been created by the outside-vehicle image reproduction unit with images having been imaged by the camera. A detailed position calculation unit calculates detailed positions of the vehicle itself by using the result of the comparison having been performed by the image comparison unit. In PTL 1, there is disclosed a technology which enables calculation of positions of the vehicle itself with accuracy in such a configuration as described above.

In non-patent literature (NPL) 1, the following technology is disclosed. In this technology, first, with respect to the arrangement of scale invariant feature transform (SIFT) feature points, scenery images having been acquired by a camera mounted in a mobile object are correlated with a database in which scenery image features have been stored in advance. Further, in this technology, through this correlation, image features, which are stored in the database, and which are assumed to have been imaged at a present position of the mobile object, are identified. Consequently, in this technology, it is determined from imaging position information corresponding to a scenery image correlated with these identified image features that the mobile object exists at a position indicated by the imaging position information.

Further, in NPL 2, the following technology is disclosed. In this technology, groups of feature points, which are extracted from two images having been imaged at respective two spots are correlated with each other. Further, in this technology, through this correlation, a fundamental matrix and a matrix representing relations between cameras with respect to relative positions and rotation angles, these matrixes representing correspondence relations between the two images, are calculated. In addition, since the scale of a distance cannot be defined, the relative positions represented by this matrix merely define directions.

CITATION LIST

Patent Literature

[PTL 1] Japanese unexamined Patent Application Publication No. 2005-326168

Non Patent Literature

[NPL 1] Haruya Kyutoku and other five authors, 'Detection of Forward Obstacles by Subtraction of Road-Surface between Present and Past In-vehicle Camera Images', Technical Digest of the 15th Symposium on Sensing via Image Information, Society of Academic Study on Sensing via Image Information, June 2009, IS 2-15-1 to IS 2-15-4

[NPL 2] Richard Hartley, 'Multiple View Geometry in Computer Vision', Cambridge University Press, March 2004, Second edition, Pages 257-259 and 290-294

SUMMARY OF INVENTION

Technical Problem

In the above-described technologies described in the above patent literatures, there is a problem that outputted position information related to a mobile object is sometimes not accurate.

A reason why the outputted position information related to a mobile object is sometimes not accurate is that, when scenery images acquired by a camera mounted in a mobile object are collated with a database in which scenery image features have been stored in advance, the reliability of the collation result is likely to be low. This will be specifically described hereinafter.

First, the technology disclosed in PTL 1 will be described. A certain scenery image sometimes includes noise, such as moving objects, which are, for example, vehicles, pedestrians and the like, roadside trees whose outlines vary as they grow, and further, shadow whose position varies every moment. The result of collation of such two images is likely to be incorrect. That is, there sometimes occurs a situation where it is impossible to calculate accurate matrixes consisting of a fundamental matrix and a matrix representing relations between cameras (imaging positions) with respective to relative positions and rotation angles. Nevertheless, even when a certain scenery image includes certain noise, some kind of matrixes consisting of a fundamental matrix and a matrix representing relations between cameras with respective to relative positions and rotation angles is calculated. Thus, inaccurate position information may be outputted.

Measures on such a problem occurred when a certain scenery image includes certain noise include a method described in NPL 2. This method is a method for determining whether calculated matrixes consisting of a fundamental matrix and a matrix representing relations between cameras with respective to relative positions and rotation angles are true or false.

Well-known examples of a general method for determination of the truth or falsehood include a method described below. In this method, first, in the case where estimated matrixes consisting of a fundamental matrix and a matrix representing relations between cameras with respective to relative positions and rotation angles are assumed, the number of inliers (the number of pairs of feature points, which satisfy the assumption) is investigated. Further, if the number of inliers as the result of the investigation is less than or equal to a threshold value, the calculated matrixes are true. Nevertheless, usually, a proportion of inclusion of certain moving objects, certain roadside trees and shadow is unknown. Consequently, it is essentially difficult to set a most appropriate threshold value with respect to the number of inliers.

Further, measures on the problem occurred when a certain scenery image includes certain noise include a different method described below, which is disclosed in NPL 1. In this method, any determination of the truth or falsehood with respect to the result of collating the individual pairs of images is not made. This method is a completely different method in which a most appropriate correspondence relation as a whole is obtained by performing DP matching on pieces of time-series data. Nevertheless, this method also includes the following problem.

First, there is a restriction that a dynamic programming (DP) matching can be applied only in the case where the imaging positions of first and last images of a sequence of input images must be the same as those of a sequence of database images.

Moreover, a similarity index calculated by the DP matching is sometimes very inaccurate. Such a situation arises in the case where an event, in which any scenery image of the database, which is to be properly correspond to a certain input scenery image, cannot be acquired because of the influence of certain moving objects, certain roadside trees, shadow and the like, successively occurs in a certain time-series data. Thus, sometimes, certain images which can be properly correlated under normal circumstances are also adversely affected. Consequently, erroneous correlation of such images is likely to occur.

Moreover, some kind of correspondence relation between individual images of a certain sequence of input images and individual image features stored in the scenery image feature database can be provided. That is, it is impossible to identify a state where proper correlation has failed (that is, a state where erroneous correlation has been provided).

An object of the present invention is to provide a positioning apparatus and a positioning method which make it possible to solve the aforementioned problems.

Solution to Problem

According to an aspect of the present invention, a positioning apparatus includes: an imaging unit that is mounted in a mobile object and images a first scenery image at a first spot where the mobile object exists;

a feature extraction unit that extracts a first image feature from the first scenery image having been imaged by the imaging unit;

an approximate position information acquisition unit that acquires a piece of first position information which is a piece of approximate position information related to the mobile object existing at the first spot;

a scenery image feature storage unit that stores therein a piece of second position information corresponding to each of second spots which are spots on a movement route along which the mobile object is predicted to move, as well as a second image feature of a second scenery image having been imaged in advance at each of the second spots, such that the piece of second position information and the second image feature are correlated with each other;

a candidate scenery image data selection unit that, on the basis of distances between a spot indicated by the piece of first position information and spots indicated by the respective pieces of second position information, selects the plurality pieces of second position information and corresponding the plurality of second image features from inside of the scenery image feature storage unit;

a relative position calculation unit that collates the first image feature with each of the plurality of second image features having been selected by the candidate scenery image data selection unit, and thereby calculates pieces of relative position information between the first spot and the respective second spots corresponding to the selected plurality of second image features; and a relative position consistency determination unit that determines consistency among the plurality pieces of relative position information having been calculated by the relative position calculation unit, and outputs a piece of determinate position information related to the mobile object on the basis of a result of the determination.

According to another aspect of the present invention, a positioning method for use in a positioning apparatus mounted in a mobile object includes: imaging a first scenery image at a first spot where the mobile object exists;

extracting a first image feature from the first scenery image having been imaged;

acquiring a piece of first position information which is a piece of approximate position information related to the mobile object existing at the first spot;

storing a piece of second position information corresponding to each of second spots which are spots on a movement route along which the mobile object is predicted to move, as well as a second image feature of a second scenery image having been imaged in advance at each of the second spots, into a scenery image feature storage means, such that the piece of second position information and the second image feature are correlated with each other;

on the basis of distances between a spot indicated by the piece of first position information and spots indicated by the respective pieces of second position information, selecting the plurality pieces of second position information and corresponding the plurality of second image features from inside of the scenery image feature storage means;

collating the first image feature with each of the selected plurality of second image features, and thereby calculating pieces of relative position information between the first spot and the respective second spots corresponding to the selected plurality of second image features; and determining consistency among the calculated plurality pieces of relative position information, and outputting a piece of determinate position information related to the mobile object on the basis of a result of the determination.

According to another aspect of the present invention, a nonvolatile medium records therein a program that causes a computer to execute processing for use in a positioning apparatus mounted in a mobile object, the processing including the processes of: imaging a first scenery image at a first spot where the mobile object exists;

extracting a first image feature from the first scenery image having been imaged;

acquiring a piece of first position information which is a piece of approximate position information related to the mobile object existing at the first spot;

storing a piece of second position information corresponding to each of second spots which are spots on a movement route along which the mobile object is predicted to move, as well as a second image feature of a second scenery image having been imaged in advance at each of the second spots, into a scenery image feature storage means, such that the piece of second position information and the second image feature are correlated with each other;

on the basis of distances between a spot indicated by the piece of first position information and spots indicated by the respective pieces of second position information, selecting the plurality pieces of second position information and corresponding the plurality of second image features from inside of the scenery image feature storage means;

collating the first image feature with each of the selected plurality of second image features, and thereby calculating pieces of relative position information between the first spot and the respective second spots corresponding to the selected plurality of second image features; and determining consistency among the calculated plurality pieces of relative position information, and outputting a piece of determinate position information related to the mobile object on the basis of a result of the determination.

Advantageous Effects of Invention

The present invention includes an advantageous effect of enabling output of accurate position information in relation to a mobile object.

BRIEF DESCRIPTION OF DRAWINGS

FIG. 14 is a diagram illustrating changes of relative position states between candidate imaging positions and present imaging positions in a second exemplary embodiment.

FIG. 15 is a flowchart illustrating operation of a positioning apparatus of a second exemplary embodiment.

FIG. 16 is a block diagram illustrating a configuration of a third exemplary embodiment.

FIG. 17 is a flowchart illustrating operation of a positioning apparatus of a third exemplary embodiment.

DESCRIPTION OF EMBODIMENTS

Next, exemplary embodiments will be described in detail with reference to the drawings.

First Exemplary Embodiment

Figure 1:
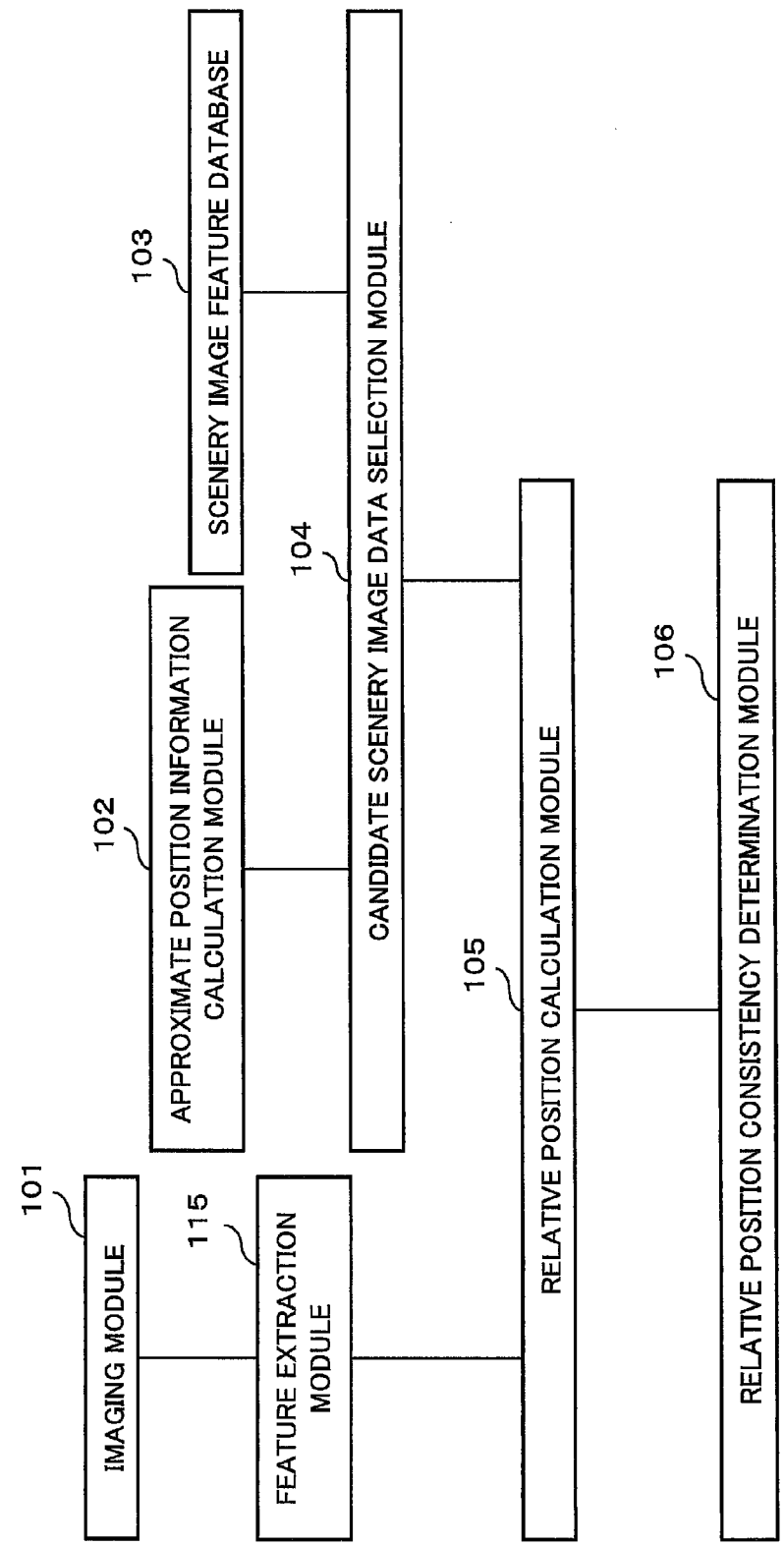
FIG. 1 is a block diagram illustrating a configuration of a first exemplary embodiment.

FIG. 1 is a block diagram illustrating a configuration of a first exemplary embodiment.

Referring to FIG. 1, a positioning apparatus 100 according to this exemplary embodiment includes an imaging module 101, a feature extraction module 115, an approximate position information calculation module 102, a scenery image feature database 103, a candidate scenery image data selection module 104, a relative position calculation module 105 and a relative position consistency determination module 106. In addition, the scenery image feature database 103 is also referred to as a scenery image feature storage means or a scenery image feature storage unit.

The positioning apparatus 100 is mounted in, for example, a mobile object (not illustrated). The mobile object is, for example, a vehicle, a robot provided with a moving means, such as a wheel or foot, a ship or a flight object. Hereinafter, the mobile object in which the positioning apparatus 100 is mounted will be referred to as a mobile object itself.

The imaging module 101, which includes a camera (not illustrated), images and outputs a present scenery image (also referred to as a first scenery image) at a spot where the mobile object itself exists (the spot being also referred to as a first spot or a present imaging position) at each of intervals of a predetermined period of time. In addition, the camera may image, for example, any one of or both of visible light rays and infrared light rays. Further, the imaging module 101 may image the present scenery image in response to an instruction from outside (for example, the relative position calculation module 105).

The feature extraction module 115 detects one or more feature points from the present scenery image having been imaged by the imaging module 101, and extracts a present image feature (also referred to as a first image feature).

Figure 2:
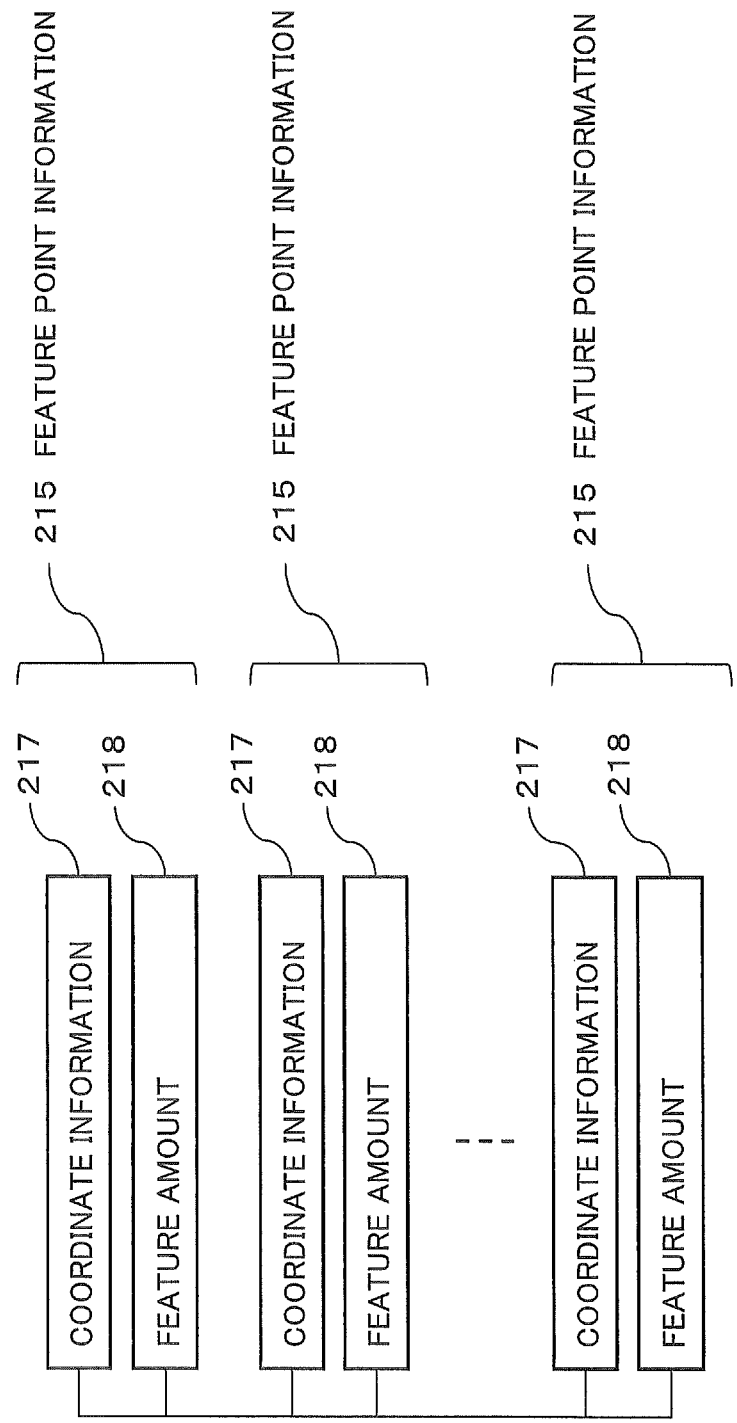
FIG. 2 is a diagram illustrating an example of a present image feature in a first exemplary embodiment.

FIG. 2 is a diagram illustrating an example of a present image feature 210. As shown in FIG. 2, the present image feature 210 includes one or more pieces of feature point information 215 each including a piece of coordinate information 217 and a feature amount 218 which correspond to one of the detected feature points. In addition, the piece of coordinate information 217 represents, for example, x and y coordinates within one of corresponding a present scenery image. Further, the feature amount 218 is, for example, a feature amount represented by a vector of 64 dimensions.

With respect to an extraction algorithm for extracting the feature points, essentially the same extraction algorithm as that for extracting feature points stored in the scenery image feature database 103 is employed. Specific examples of this extraction algorithm include a speeded-up robust feature (SURF) method and a SIFT method.

The approximate position information calculation module 102 includes a positioning module (not illustrated), such as a GPS receiver (not illustrated) or a vehicle speed pulse acquisition apparatus (not illustrated).

The approximate position information calculation module 102 further includes an electronic control unit (ECU). The ECU is a unit which, for example, performs processing on data from the positioning module and outputs a piece of approximate position information and a piece of moving direction information (also collectively referred to as a piece of first position information) which are related to the mobile object itself. The ECU calculates the piece of approximate position information and the piece of moving direction information as of then on the basis of information acquired from radio waves having been received from GPS satellites, or vehicle speed pulse information.

Further, the approximate position information calculation module 102 may be further provided with, for example, an electronic compass as a means for acquiring the moving direction information.

The scenery image feature database 103 stores therein a plurality of records for candidate scenery image data.

One of the plurality of records includes a candidate image feature (a second image feature) and a corresponding piece of candidate imaging position information (a piece of second position information). The candidate image feature includes the x coordinate, the y coordinate and the feature quantity of the feature point which was extracted from candidate scenery image (also referred to as the second scenery image) which was imaged in advance at spot (also referred to as the second spot or the candidate imaging position) on a movement route where the mobile object is predicted to move. That is, an aggregate of pieces of data, in which an image feature of the candidate scenery image having been imaged at a certain spot is correlated with a piece of candidate imaging position information corresponding to the spot, is referred to as a record.

Figure 3:
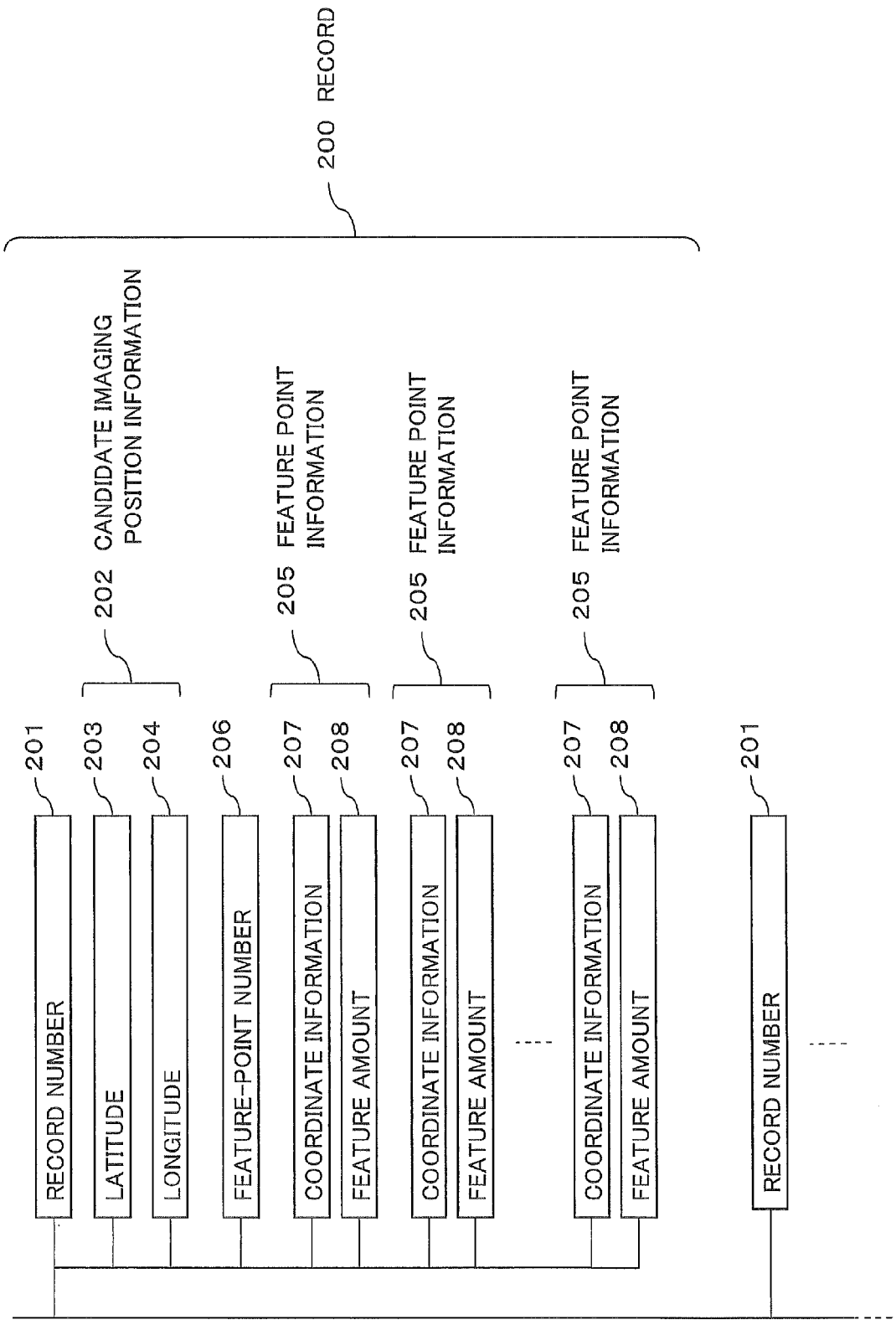
FIG. 3 is a diagram illustrating an example of a record of a scenery image feature database in a first exemplary embodiment.

FIG. 3 is a diagram illustrating an example of one of records 200 stored in the scenery image feature database 103. As shown in FIG. 3, one of the records 200 includes a record number 201, a piece of candidate imaging position information 202, a feature-point number 206 and pieces of feature point information 205, all of these kinds of information corresponding to the candidate scenery image having been imaged at a certain spot.

The piece of candidate imaging position information 202 is a piece of information which indicates a spot, at which a corresponding candidate scenery image was imaged, by using a latitude 203 and a longitude 204.

The feature-point number 206 indicates the number of feature points of the corresponding candidate scenery image.

The piece of feature point information 205 is part of the candidate image feature, and includes a piece of coordinate information 207 and a feature amount 208 which are related to one of feature points of the corresponding candidate scenery image. In addition, the piece of coordinate information 207 represents, for example, x and y coordinates within one of the corresponding candidate scenery image. Further, the feature amount 208 is, for example, a feature amount represented by a vector of 64 dimensions.

The candidate scenery image data selection module 104 selects a plurality of records 200 on the basis of a distance between a spot indicated by a piece of approximate position information and spots indicated by position information. Here, the spot indicated by a piece of approximate position information means a spot indicated by the piece of approximate position information which is related to the mobile object itself, and which was calculated by the approximate position information calculation module 102. Further, the spots indicated by the position information means spots which are indicated by the pieces of position information included in the records 200 stored in the scenery image feature database 103, respectively.

Specifically, for example, the candidate scenery image data selection module 104, first, selects one of the record 200 stored in the scenery image feature database 103 on the basis of the piece of approximate position information and the piece of moving direction information. This selected record 200 corresponds to a candidate imaging position which is positioned at the posterior side in the moving direction, and which is positioned closest to the approximate position. Moreover, the candidate scenery image data selection module 104 selects two ones of the records 200 stored in the scenery image feature database 103 on the basis of the piece of approximate position information and the piece of moving direction information. These selected records 200 correspond to respective two candidate imaging positions which are positioned at the anterior side in the moving direction, and the pair of which is positioned closest to the approximate position.

In addition, the number of records 200 to be selected by the approximate position information calculation module 102 may not be just three, but may be any number no smaller than two. In this regard, however, actually, a record 200 positioned closer to the present position (the approximate position) of the mobile object itself includes more highly expectation value to be able to acquire about a relatively accurate relative position. Thus, any number around between two and five is suitable for the number of records 200 to be selected.

The relative position calculation module 105 collates the pieces of feature point information 215 of the present image feature 210, which have been extracted by the feature extraction module 115, with each of the pieces of feature point information 205 included in one of the records 200 having been selected by the candidate scenery image data selection module 104. Further, the relative position calculation module 105 calculates and outputs a piece of relative position information indicating whether a present imaging position of the imaging module 101 is anterior to or posterior to a candidate imaging position corresponding to the one of the selected records 200 with respect to the moving direction. As having been already described, this present imaging position means the position at which the imaging module 101 imaged the corresponding present scenery image. The relative position calculation module 105 performs the above collation of feature points as well as the above calculation and output of a piece of relative position information, with respect to each of the plurality of records 200 having been selected by the candidate scenery image data selection module 104.

Figure 4:
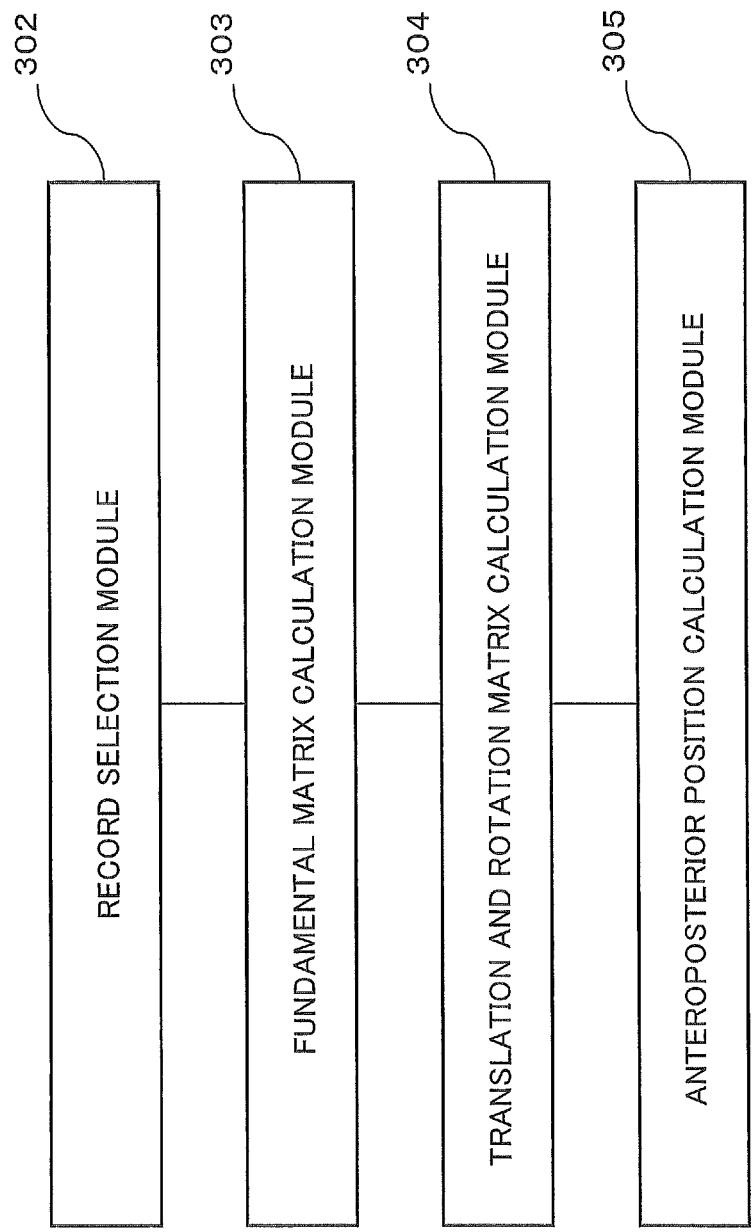
FIG. 4 is block diagram illustrating a configuration of a relative position calculation module of a first exemplary embodiment.

FIG. 4 is a block diagram illustrating a configuration of the relative position calculation module 105. Referring to FIG. 4, the relative position calculation module 105 includes a record selection module 302, a fundamental matrix calculation module 303, a translation and rotation matrix module 304 and a anteroposterior position calculation module 305.

The record selection module 302 selects a record 200 on a one-by-one basis from among the plurality of records 200 having been selected by the candidate scenery image data selection module 104.

The fundamental matrix calculation module 303 calculates a fundamental matrix which indicates a piece of position information related to a present imaging position of the imaging module 101 with respect to a candidate imaging position on the basis of the pieces of feature point information 215 and the pieces of feature point information 205. Here, these pieces of feature point information 215 are the pieces of feature point information 215 which have been extracted by the feature extraction module 115, and which are included in the present image feature 210 corresponding to the present scenery image. Further, these pieces of feature point information 205 are the pieces of feature point information 205 included in each of the plurality of records 200 which has been selected by the record selection module 302. Further, this candidate imaging position is the candidate imaging position indicated by the piece of candidate imaging position information 202 included in each of the plurality of records 200 which has been selected by the record selection module 302.

In addition, a method of correlating the feature points is described in NPL 1, and a method of calculating the fundamental matrix is described in NPL 2.

In addition, the fundamental matrix calculation module 303 may assume an estimated fundamental matrix once to investigate the number of inliers (the number of feature-point pairs which satisfy the assumption), and if the number of inliers is smaller than or equal to a threshold value, the fundamental matrix calculation module 303 may conclude that the fundamental matrix could not be calculated.

The translation and rotation matrix calculation module 304 calculates a translation matrix having a size of 3×3 which represents a translation amount and a rotation amount of the imaging module 101 by applying numerical arithmetic processing, such as singular-value decomposition processing, to the fundamental matrix having been calculated by the fundamental matrix calculation module 303. An algorithm for calculating a matrix (S([t]x)), which represents the translation amount, and a matrix (R), which represents the rotation amount, from the fundamental matrix is indicated by, for example, a formula (9.14) which is described on page 258 of NPL 2. In addition, since a scale cannot be defied, the matrix representing the translation amount of the imaging module 101 indicates only a moving direction, and the absolute value of a movement amount cannot be defined.

In addition, in the case where the fundamental matrix could not be calculated by the fundamental matrix calculation module 303, the translation and rotation matrix calculation module 304 concludes that the translation and rotation matrixes are 'uncertain'.

The anteroposterior position calculation module 305 determines whether a present imaging position of the imaging module 101 is anterior to or posterior to a position indicated by the piece of candidate imaging position information 202 on the basis of a translation amount of the imaging module 101. Here, this translation amount of the imaging module 101 means the translation amount of the imaging module 101, which has been calculated by the translation and rotation matrix calculation module 304. Further, this position indicated by the piece of candidate imaging position information 202 means the position indicated by the piece of candidate imaging position information 202 included in each of the plurality of records 200s, which has been selected by the record selection module 302.

Further, the anteroposterior position calculation module 305 outputs a piece of relative position information on the basis of this determination result.

Figure 5:
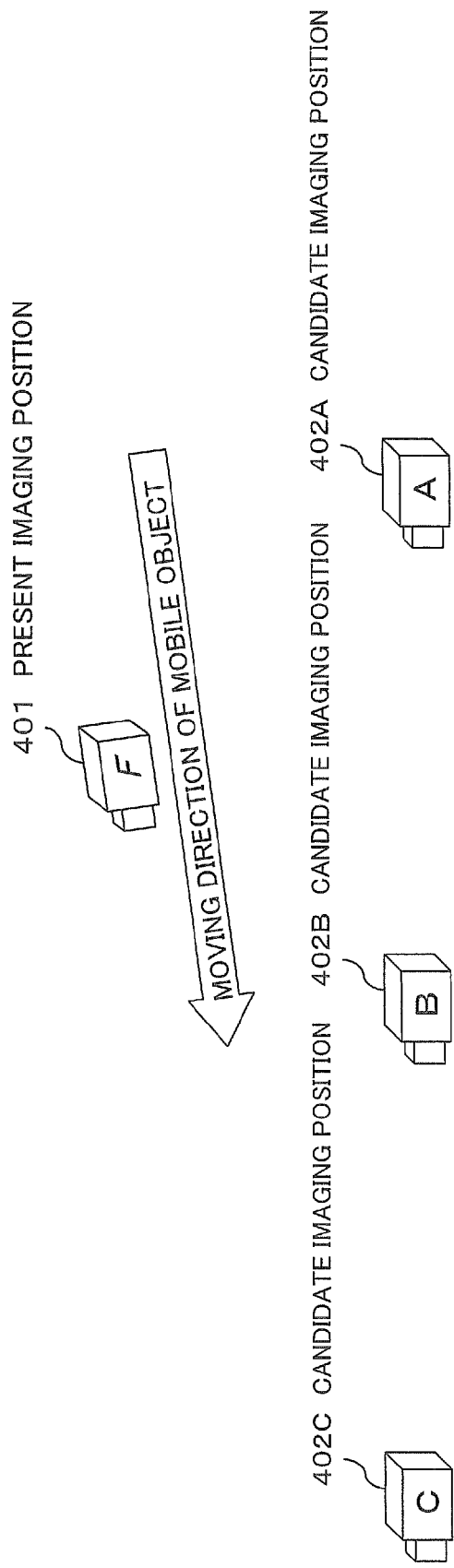
FIG. 5 is a diagram illustrating an example of relations between candidate imaging positions and present imaging positions in a first exemplary embodiment.

FIG. 5 is a diagram illustrating an example of relations between candidate imaging positions 402A to 402C of three spots 'A' to 'C' corresponding to the records 200 stored in the scenery image feature database 103 and a present imaging position 401 of a spot 'F' at which the imaging module 101 (the mobile object itself) exists. Referring to FIG. 5, the anteroposterior position calculation module 305 determines that the present imaging position 401 of the imaging module 101 is anterior to, posterior to and posterior to the respective candidate imaging positions 402A to 402C corresponding to the three records 200.

Specifically, the anteroposterior position calculation module 305 makes this determination as follows.

Figure 6:
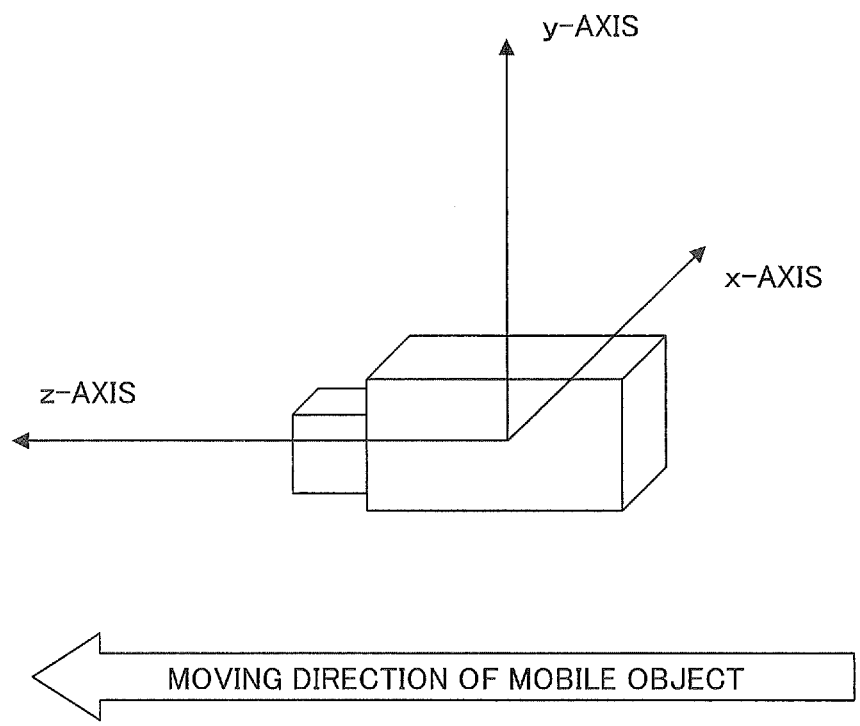
FIG. 6 is a diagram illustrating an imaging module placed on a three-dimensional coordinate system in a first exemplary embodiment.

FIG. 6 is a diagram illustrating the imaging module 101 placed on a three-dimensional coordinate system. As shown in FIG. 6, when a coordinate system in which an optic-axis of the imaging module 101 corresponds to a Z axis is defined, a tz component of a matrix, which is expressed by the following expression (1) and which represents a translation amount of the imaging module 101, represents a component of the translation amount of the imaging module 101 relative to the optic-axis direction of the imaging module 101. Accordingly, the anteroposterior position calculation module 305 determines that the present imaging position of the imaging module 101 is anterior thereto if a value of the tz component is positive, and is posterior thereto if the value of the tz component is negative.

$$\begin{bmatrix} 0 & -t_z & t_y \\ t_z & 0 & -t_x \\ -t_y & t_x & 0 \end{bmatrix} \quad (1)$$

However, when the translation and rotation matrix calculation module 304 has determined that the translation and rotation matrix is 'uncertain', the anteroposterior position calculation module 305 outputs 'uncertain'.

The relative position consistency determination module 106 determines consistency among the pieces of relative position information which have been calculated by the relative position calculation module 105. Further, the relative position consistency determination module 106 outputs, on the basis of this determination result, a piece of determinate position information indicating the present position or a notification notifying that a piece of determinate position information is uncertain.

The determination of the consistency of relative position information made by the relative position consistency determination module 106 and processing based on the determination result performed thereby will be specifically described by giving an example.

For example, it is supposed that candidate imaging positions of the respective three records 200 have such a positional relation as shown in FIG. 5.

In this case, further, it is supposed that the anteroposterior position calculation module 305 has determined that the present imaging position 401 is anterior to the candidate imaging position 402A, and is posterior to the candidate imaging positions 402B and 402C, and has calculated corresponding pieces of relative position information.

In this case, the relative position consistency determination module 106 determines that there is no inconsistency among these three pieces of relative position information. That is, the relative position consistency determination module 106 determines that the present position of the mobile object itself is positioned between the candidate imaging positions 402A and 402B.

Further, the relative position matching determination module 106 outputs, for example, a central position between the candidate imaging positions 402A and 402B as a piece of determinate position information corresponding to the present position of the mobile object itself.

In contrast, it is supposed that the anteroposterior position calculation module 305 has determined that the present imaging position 401 is posterior to the candidate imaging position 402A, and is anterior to the candidate imaging positions 402B, and has calculated corresponding pieces of relative position information. Alternatively, it is supposed that the relative position calculation module 105 could not calculate a piece of relative position information corresponding to any one of the candidate imaging positions, and has determined that the anteroposterior relation is uncertain.

In this case, the relative position consistency determination module 106 determines that there is inconsistency among the pieces of relative position information. That is, the relative position consistency determination module 106 does not determine any present position of the mobile object itself at a present clock time. In addition, in the following description, a clock time means a clock time at which a present scenery image was imaged, and a present clock time means a clock time at which the latest present scenery image was imaged.

Subsequently, the relative position consistency determination module 106 outputs 'uncertain' in substitution for a piece of determinate position information as of the clock time (i.e., a clock time at which the present scenery image was imaged at the present imaging position 401).

Next, operation of this exemplary embodiment will be described in detail with reference to FIGS. 1 to 7.

Figure 7:
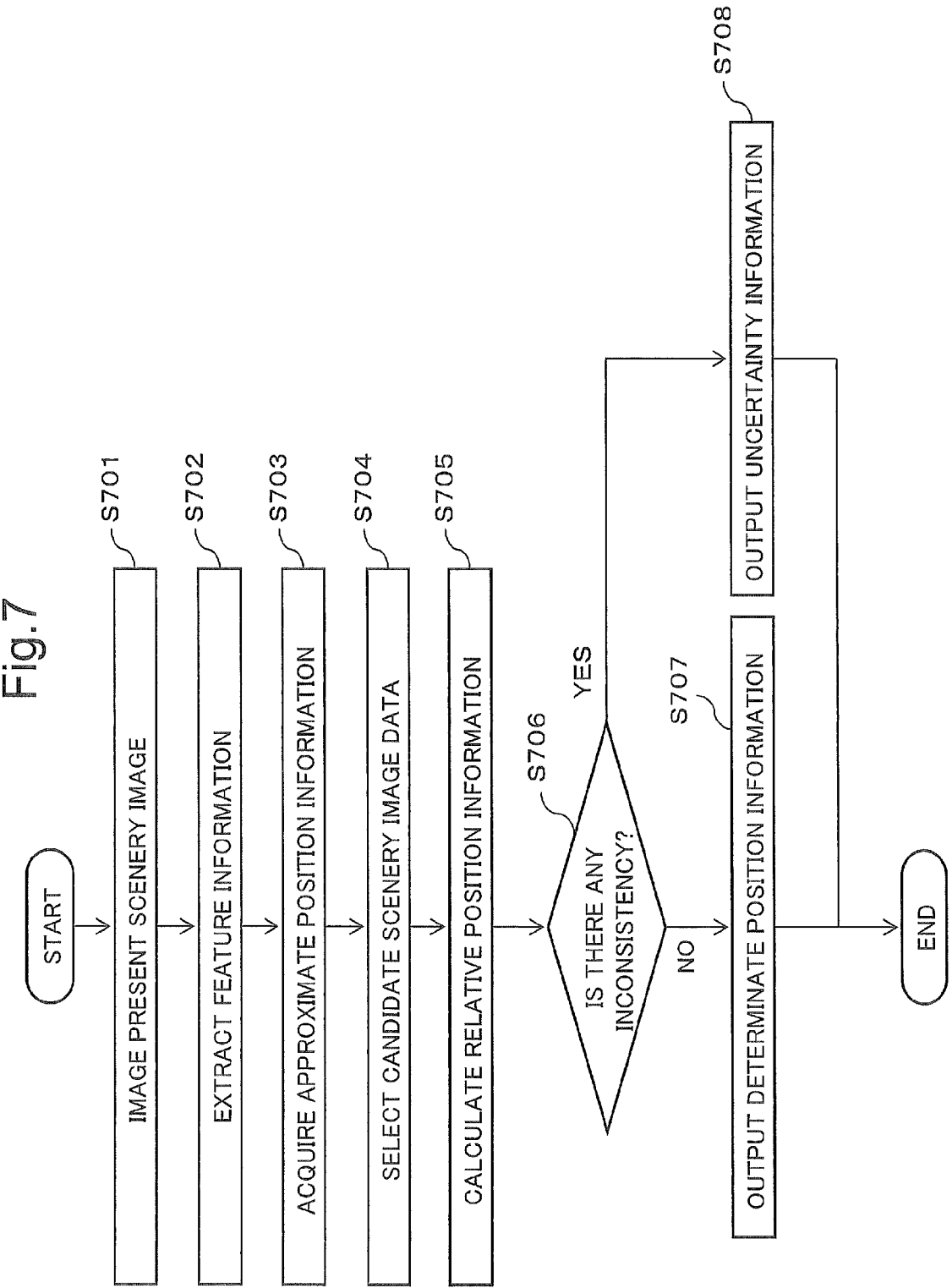
FIG. 7 is a flowchart illustrating operation of a positioning apparatus of a first exemplary embodiment.

FIG. 7 is a flowchart illustrating operation of a positioning apparatus according to this exemplary embodiment.

First, the imaging module 101 images a present scenery image around a mobile object (a mobile object itself) in which the imaging module 101 itself is mounted (step S701).

Next, the feature extraction module 115 detects one or more feature points from the present scenery image having been imaged by the imaging module 101, and extracts the present image feature 210 (step S702).

The approximate position information calculation module 102 calculates a piece of approximate position information and a piece of moving direction information related to the mobile object itself (step S703).

The candidate scenery image data selection module 104 extracts a plurality of records 200 which are among the records 200 stored in the scenery image feature database 103, and which were imaged and data-acquired at respective spots nearby a position indicated by the piece of approximate position information related to the mobile object itself (step S704).

The relative position calculation module 105 collates the pieces of feature point information 215 included in the present image feature 210 having been extracted by the feature extraction module 115 with each of the pieces of feature point information 205 included in each of the plurality of records 200 having been selected by the candidate scenery image data selection module 104. Further, the relative position calculation module 105 calculates and outputs pieces of relative position information each indicating whether the present imaging position is, in the moving direction, anterior to or posterior to candidate imaging positions corresponding to the respective selected plurality of records 200 (step S705).

The relative position consistency determination module 106 determines the presence or absence of inconsistency among the plurality pieces of relative position information having been calculated in step S705 (step S706).

When having determined that there is no inconsistency (Yes in step S706), the relative position matching determination module 106 outputs a piece of determinate position information (step S707). Then, the process flow is terminated.

In contrast, when having determined that there is inconsistency (No in step S706), the relative position consistency determination module 106 determines that it is impossible to identify the present position of the mobile object itself at the clock time at which the corresponding present scenery image was imaged, and outputs uncertainty information indicating that it is impossible to identify (step S708). Then, the process flow is terminated.

Figure 8:
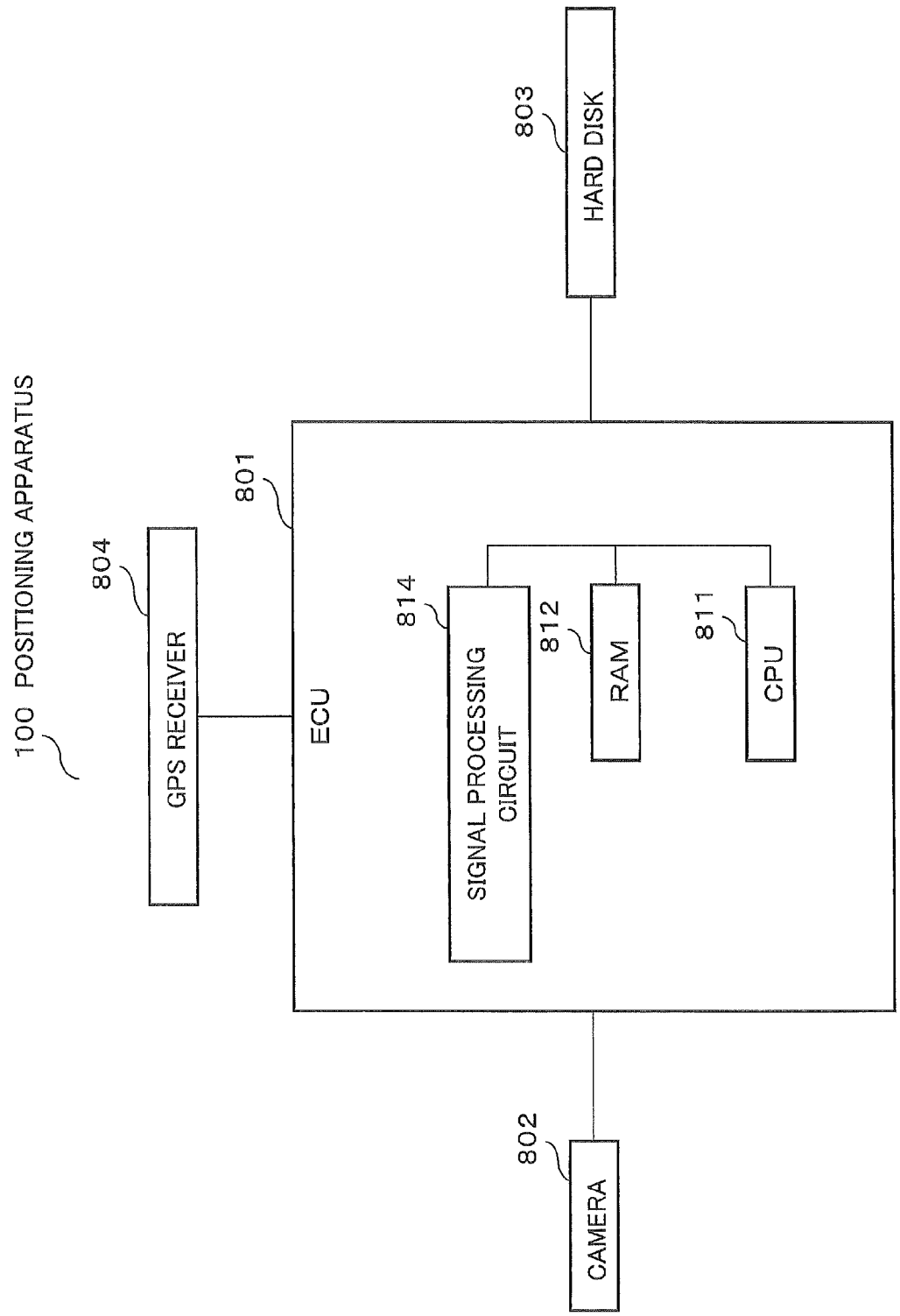
FIG. 8 is a diagram illustrating a configuration of a positioning apparatus which causes a program thereof to execute predetermined processing in a first exemplary embodiment.

The above-described positioning apparatus 100 may cause a computer to execute programs and thereby perform predetermined processing, such as shown in FIG. 8.

FIG. 8 is a diagram illustrating a configuration of the positioning apparatus 100 which causes a computer to execute programs and thereby perform predetermined processing. Referring to FIG. 8, the positioning apparatus 100 includes an electronic control unit (ECU) 801, a camera 802, a hard disk 803 and a GPS receiver 804.

The ECU 801 is a control unit for controlling the entire apparatus, and includes a central processing unit (CPU) 811, random access memory (RAM) 812 and signal processing circuit 814.

The camera 802 is part of the imaging module 101.

The GPS receiver 804 is part of the approximate position information calculation module 102.

In the above-described configuration, the positioning apparatus 100 may realize the functions and the determination logics included in the flowchart shown in FIG. 7 by executing predetermined processing on the basis of programs, except for the functions of the camera 802 and the GPS receiver.

The CPU 811 reads out programs, which are stored, for example, in the hard disk 803, into, for example, the RAM 812, and executes predetermined processing on the basis of the read-out programs.

The hard disk 803 stores therein programs which cause a computer to execute part of processing as a communication controller in each the above-described exemplary embodiments.

The RAM 812 stores therein the programs and the content of control information and data (for example, the present image feature 210) used by the programs.

The signal processing circuit 814 converts data related to images having been imaged by the camera 802 and GPS signals having been received by the GPS receiver 804 into formatted data which can be processed by programs operating on the CPU 811, and stores the formatted data into the RAM 812.

In addition, the ECU 801 may be realized by a microcomputer by configuring it such that the functions thereof can be executed by hardware. Moreover, the ECU 801 may be configured such that part of the functions thereof to be executed is realized by hardware, and the same functions thereof are realized by cooperated operation of the hardware and software (programs).

The hard disk 803 may store therein the scenery image feature database 103. The hard disk 803 may be a storage medium other than the hard disk, such as flash memory.

Figure 9:
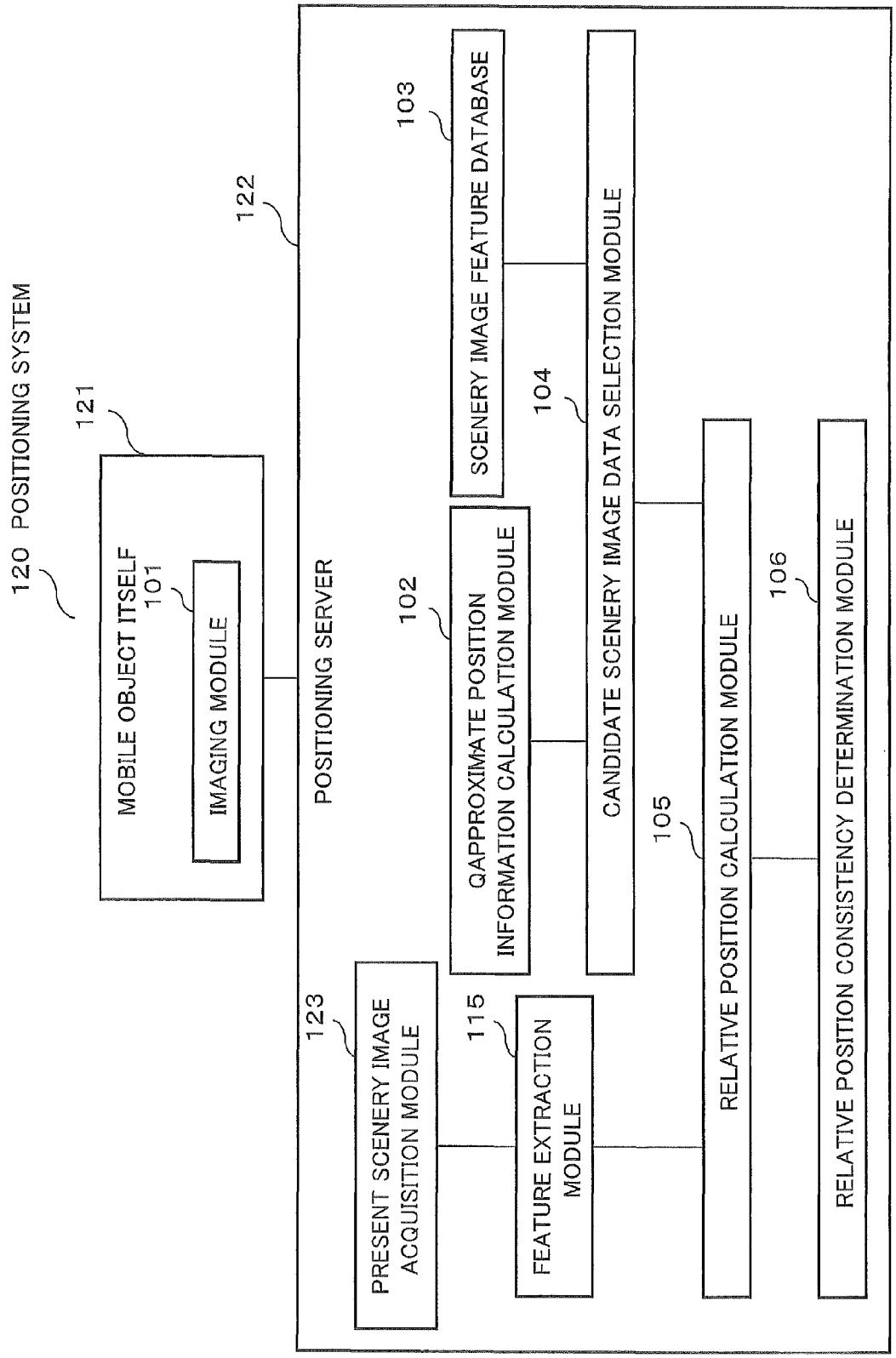
FIG. 9 is a block diagram illustrating a configuration of a first modification example of a positioning system according to a first exemplary embodiment.

In order to configure a positioning system 120, as shown in FIG. 9, the above-described positioning apparatus may be configured such that only the imaging module 101 is mounted in a mobile object itself 121, and components other than it are mounted in a positioning server 122.

FIG. 9 is a block diagram illustrating a configuration of the positioning system 120 according to this exemplary embodiment as a first modification example.

A communication controller (not illustrated) of the mobile object itself 121 transmits a present scenery image having been imaged by the imaging module 101 to the positioning server 122 via networks (not illustrated).

A present scenery image acquisition module 123 of the positioning server 122 receives the present scenery image via networks and outputs it to the feature extraction module 115. In addition, a communication controller (not illustrated) of the positioning server 122 may transmit the piece of determinate position information having been outputted by the relative position consistency determination module 106 to outsides via networks. Here, examples of the outsides include a car navigation system mounted in the mobile object itself or a mobile telephone of a person boarding on the mobile object itself.

Figure 10:
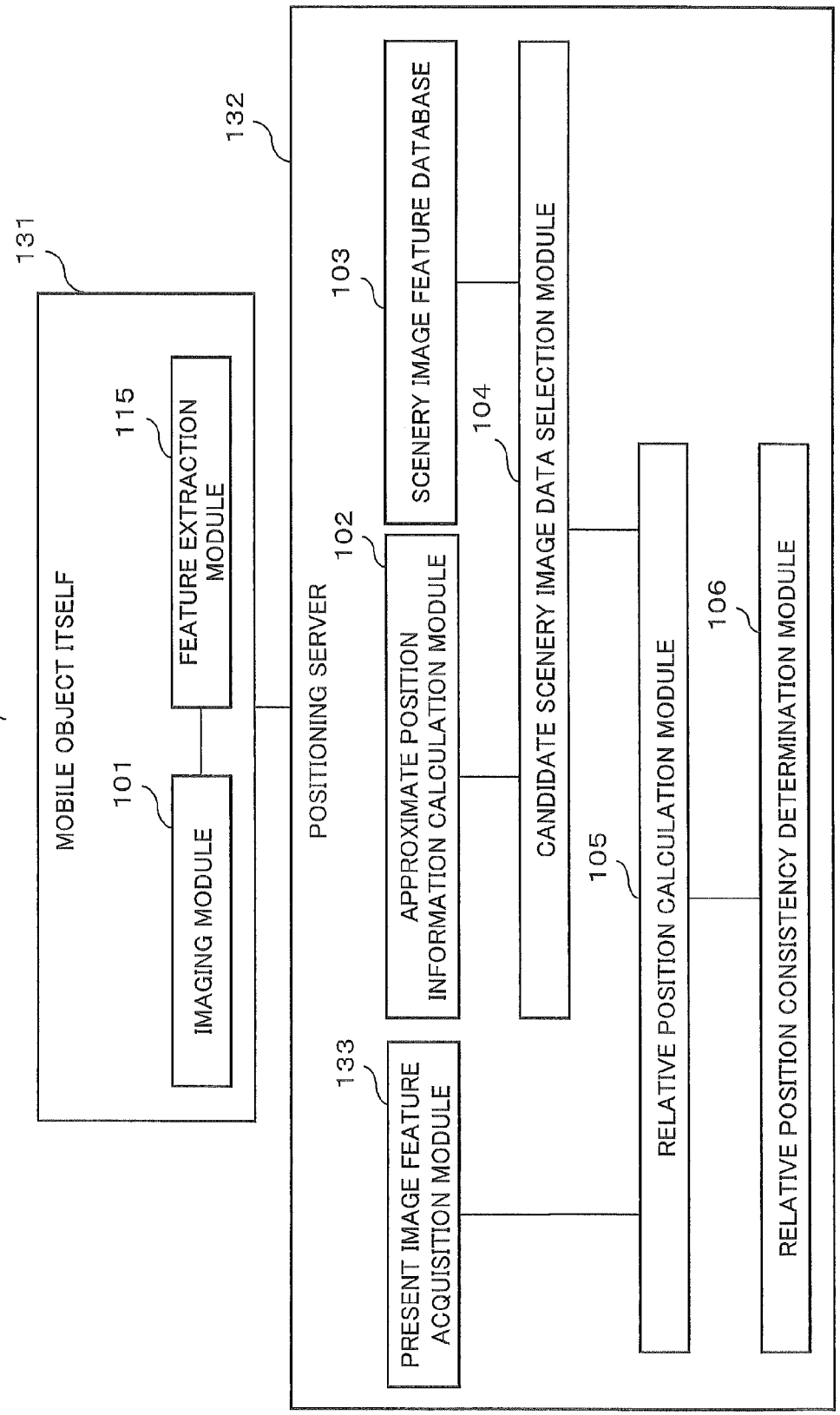
FIG. 10 is a block diagram illustrating a configuration of a second modification example of a positioning system according to a first exemplary embodiment.

In order to configure a positioning system 130, as shown in FIG. 10, the above-described positioning apparatus may be configured such that the imaging module 101 and the feature extraction module 115 are mounted in a mobile object itself 131 and other components are mounted in a positioning server 132.

FIG. 10 is a block diagram illustrating a configuration of the positioning system 130 according to this exemplary embodiment as a second modification example.

A communication controller (not illustrated) of the mobile object itself 131 transmits the present image feature point 210 having been extracted by the feature extraction module 115 to the positioning server 132 via networks (not illustrated).

A present scenery image acquisition module 133 of the positioning server 132 receives the present image feature point 210 via networks and outputs it to the relative position calculation module. In addition, a communication controller (not illustrated) of the positioning server 132 may transmit the piece of determinate position information having been outputted by the relative position consistency determination module 106 to outsides via networks. Here, examples of the outsides include a car navigation system mounted in the mobile object itself or a mobile telephone of a person boarding on the mobile object itself.

Figure 11:
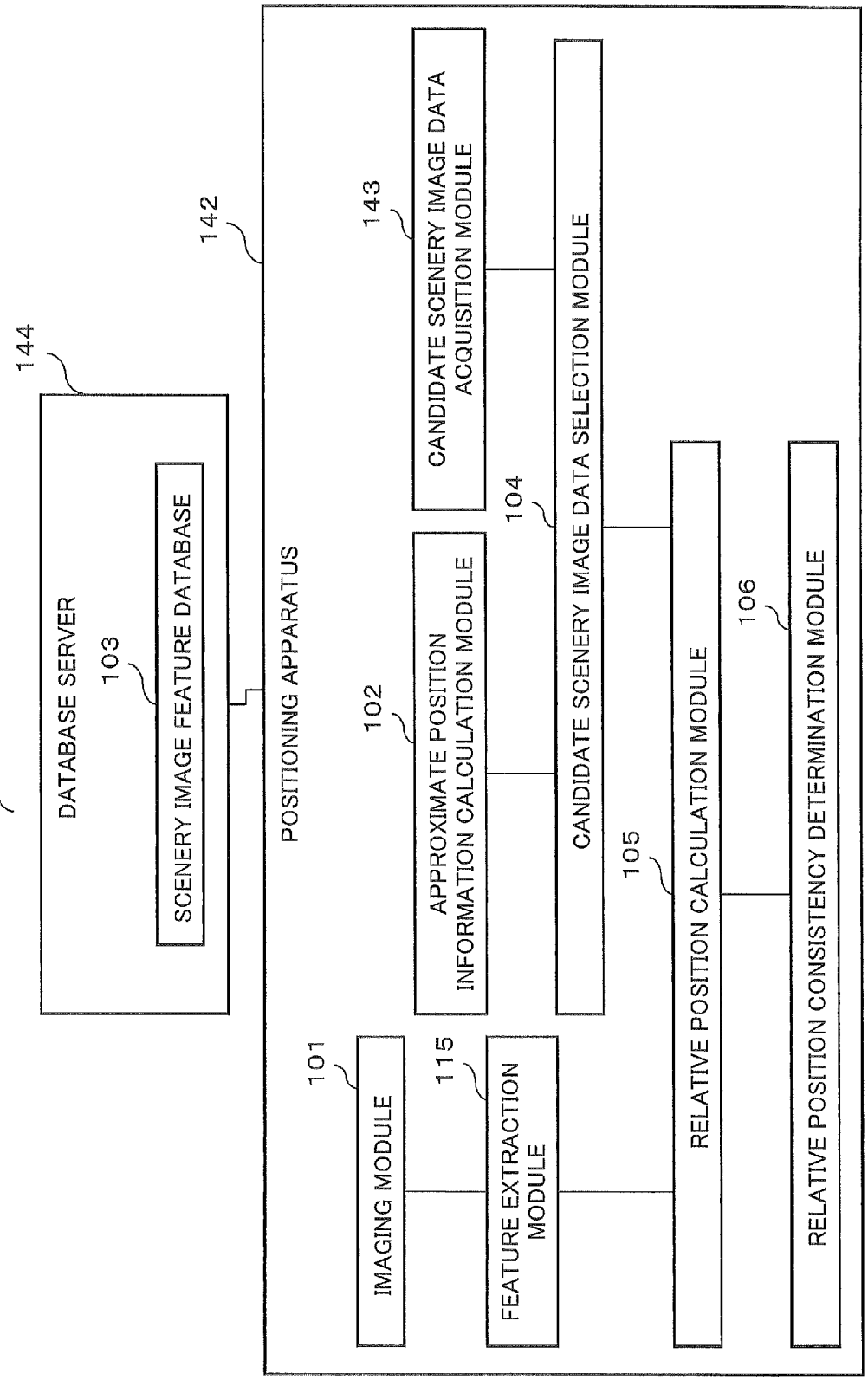
FIG. 11 is a block diagram illustrating a configuration of a third modification example of a positioning system according to a first exemplary embodiment.

In order to configure a positioning system 140, as shown in FIG. 11, the above-described positioning apparatus may be configured such that the scenery image feature database 103 is mounted in a database server 144 and other components are mounted in a positioning apparatus 142.

FIG. 11 is a block diagram illustrating a configuration of the positioning system 140 according to this exemplary embodiment as a third modification example.

A communication controller (not illustrated) of the database server 144 receives an acquisition request for records 200 via networks (not illustrated), and replies to this request to transmit the requested records 200s to the positioning apparatus 142.

A candidate scenery image data acquisition module 143 of the positioning apparatus 142 transmits an acquisition request specific records 200 to the database server 144 via networks.

Next, the candidate scenery image data acquisition module 143 receives records 200, which have been transmitted as a reply to the acquisition request, and outputs the records 200. Here, these specific records 200 are the records 200 having been selected by the candidate scenery image data selection module 104.

Each of the positioning system 120 and the positioning system 130 may be configured so as to be combined with the positioning system 140.

A first advantageous effect of the above-described exemplary embodiment is that it is made possible to output pieces of accurate position information related to the mobile object itself.

A reason for this is that the following configurations are involved.

That is, first, the imaging module 101 mounted in the mobile object itself images a present scenery image. Second, the feature extraction module 115 extracts the present image feature 210 on the basis of the present scenery image. Third, the approximate position information calculation module 102 calculates a piece of approximate position information related to the mobile object itself. Fourth, the candidate scenery image data selection module 104 selects a plurality of records 200 from among the records 200 stored in the scenery image feature database 103 on the basis of the piece of approximate position information. Fifth, the relative position calculation module 105 calculates and outputs pieces of relative position information by collating the present image feature 210 with the pieces of feature point information 205 included in each of the plurality of records 200 having been selected thereby. Sixth, the relative position consistency determination module 106 outputs a piece of determinate position information on the basis of the result of determination on the consistency among the pieces of relative position information.

The aforementioned advantageous effect of this exemplary embodiment will be described in more detail.

In positioning apparatuses each for identifying a present position of a mobile object itself by collating the positions of feature points with those stored in a database, the positioning apparatus 100 according to this exemplary embodiment is capable of identifying the position of the mobile object itself with higher accuracy. In particular, the positioning apparatus 100 is capable of determining the accuracy of the position estimation result. That is, the positioning apparatus 100 is capable of reducing the occurrences of erroneous determination with respect to the position of the mobile object itself even under the state where it is impossible to correctly calculate positional relations between a position indicated by the piece of approximate position information and positions indicated by the respective pieces of imaging position information because of influence of moving objects, roadside trees, shadow and the like.

A reason for this is that the positioning apparatus 100 performs such operation as described below, unlike a method disclosed in NPL 2, in which position identification is performed merely from the result of a collation of one image of a sequence of input scenery images with one image stored in a database. That is, the reason is that the positioning apparatus 100 outputs a piece of determinate position information on the basis of the consistency of each of the results of collations between pieces of information related to inputted at least one image of a sequence of present scenery images and pieces of information related to a plurality of images stored in the scenery image feature database 103.

Specifically, this is because the positioning apparatus 100 operates as follows. First, the positioning apparatus 100 calculates pieces of relative position information related to the mobile object itself with respect to a respective plurality of spots which are positioned in the neighborhood of a piece of approximate position, and which are stored in the scenery image feature database 103. Second, in the case where there is no inconsistency among the calculated pieces of relative position information, the positioning apparatus 100 outputs a piece of determinate position information related to the mobile object itself. Third, in the case where there is inconsistency, the positioning apparatus 100 does not output any piece of determinate position information related to the mobile object itself.

For example, in the case where moving objects, such as vehicles and pedestrians, and further, roadside trees whose outlines vary as they grow, shadow whose position varies every moment and the like are included a lot in scenery images, the consistency is unlikely to be satisfied.

In this regard, the positioning apparatus 100 is capable of detecting a situation in which the accurate identification of the position of the moving object of interest has failed, thereby enabling suppression of the occurrences of an erroneous determination.

Specifically, this can be considered in such a simplified manner as follows. First, it is supposed that a probability that positional relations between a position indicated by the piece of approximate position information and a position indicated by the piece of imaging position information cannot be calculated correctly because of influence of moving objects, roadside trees, shadow and the like is represented by e (e<1). In this case, a probability of erroneously calculating the relative positions of the mobile object itself with respect to all of N spots (N is an integer no smaller than 2) positioned in the neighborhood of the approximate position, stored in the scenery image feature database 103, results in the N-th power of e. Accordingly, since the N-th power of e is smaller than e, the occurrences of an erroneous determination are reduced.

Moreover, since the positioning apparatus 100 does not utilize a DP matching method, even when the imaging positions of first and last images of a sequence of input images are not matched with those of first and last images of a sequence of images stored in a database, it is possible to identify the position of the mobile object itself with a high degree of accuracy.

A second advantageous effect of the above-described exemplary embodiment is that there is no restriction that an imaging direction (a moving direction of the mobile object itself) at the time when the corresponding a present scenery image was imaged by the imaging module 101 must be completely matched with imaging directions at the time when candidate scenery images for creating the database were imaged.

A reason for this is that the positioning apparatus 100 is configured so as to calculate anteroposterior relations on the basis of a component of a translation matrix which represents positional relations between pieces of imaging position information included in the respective records 200 having been selected on the basis of a piece of approximate position information, and a piece of position information related to the present imaging position.

For example, in a method described in NPL 1, since a distance between a vanishing point and an epipole is handled as a similarity index, there is a restriction that a traveling direction when acquiring input images must be in parallel with that when creating a database.

A third advantageous effect of the above-described exemplary embodiment is that it is possible to reduce the volume of hardware mounted in each mobile object itself. This advantageous effect is brought by the first to third modification examples shown in FIGS. 9 to 11.

A reason for this is that the imaging module 101, or the imaging module 101 and the feature extraction module 115, are configured so as to be mounted in a mobile object itself, and other components are configured so as to be mounted in a positioning server. Moreover, the reason is that, similarly, the scenery image database 103 is configured so as to be mounted in a database server.

Second Exemplary Embodiment

Next, a second exemplary embodiment will be described in detail with reference to the drawings. Hereinafter, description of the contents overlapping with those of the above-described description will be omitted within a scope which does not make description of this exemplary embodiment unclear.

Figure 12:
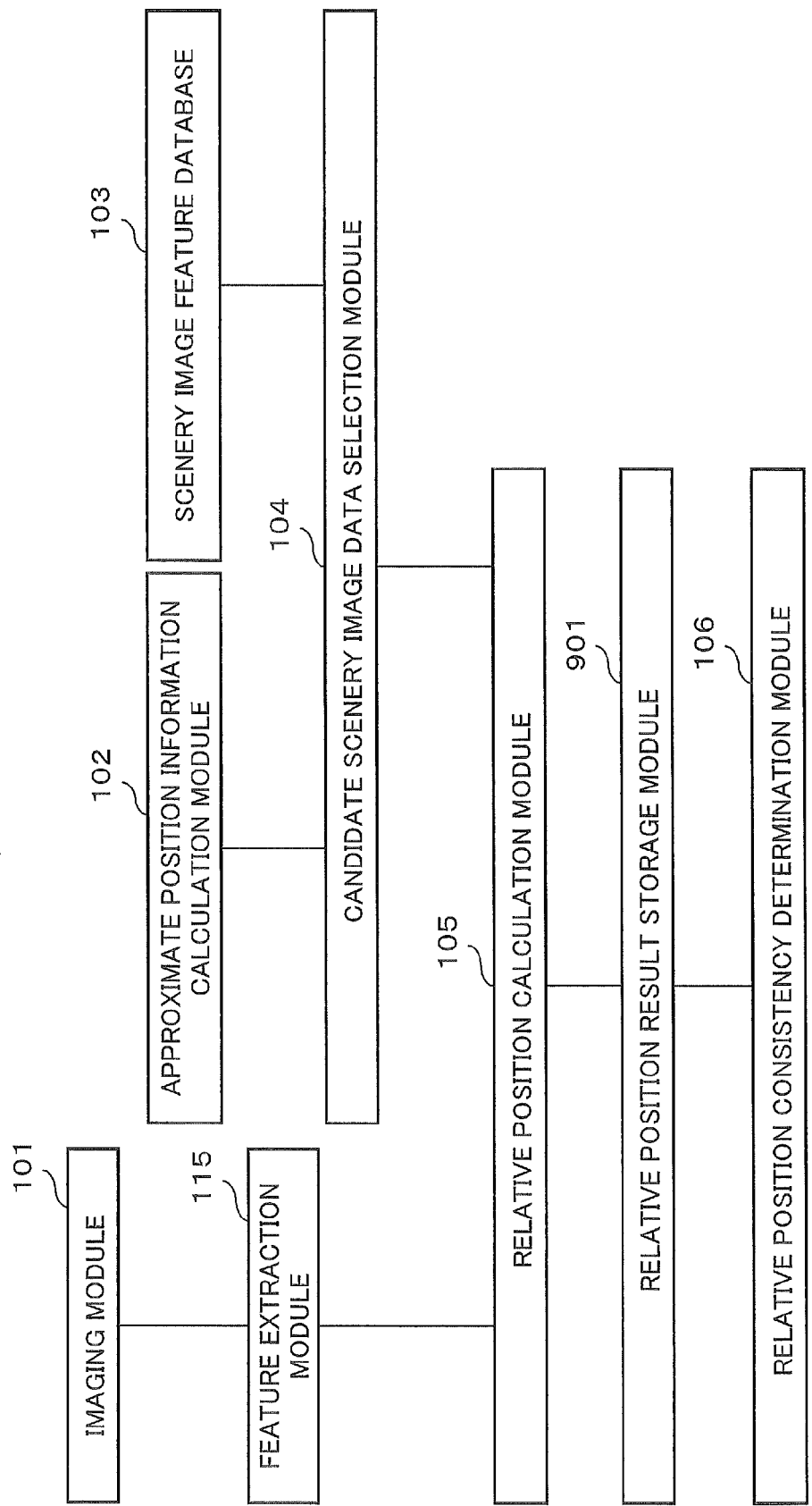
FIG. 12 is a block diagram illustrating a configuration of a second exemplary embodiment.

FIG. 12 is block diagram illustrating a configuration of a second exemplary embodiment. Referring to FIG. 12, a positioning apparatus 900 according to this exemplary embodiment includes a relative position result storage module 901 in addition to the configuration of the positioning apparatus 100, shown in FIG. 1, according to the first exemplary embodiment.

The imaging module 101, the approximate position information calculation module 102, the scenery image feature database 103, the candidate scenery image data selection module 104, the relative position calculation module 105 and the feature extraction module 115 are completely the same as those of the first exemplary embodiment shown in FIG. 1.

The relative position result storage module 901 is a module which stores therein, for a constant period, the result of a calculation performed at each of present and past clock times by the relative position calculation module 105. Kind of stored information is a clock time t at which the imaging module 101 imaged a present scenery image, and corresponding pieces of relative position information having been calculated by the relative position calculation module 105.

The relative position consistency determination module 106 determines consistency among pieces of relative position information corresponding to a plurality of clock times t (that is, each of clock times t at which the imaging module 101 imaged a present scenery image) out of the pieces of relative position information stored in the relative position result storage module 901.

Specific operation of this determination will be described with reference to FIG. 13.

Figure 13:
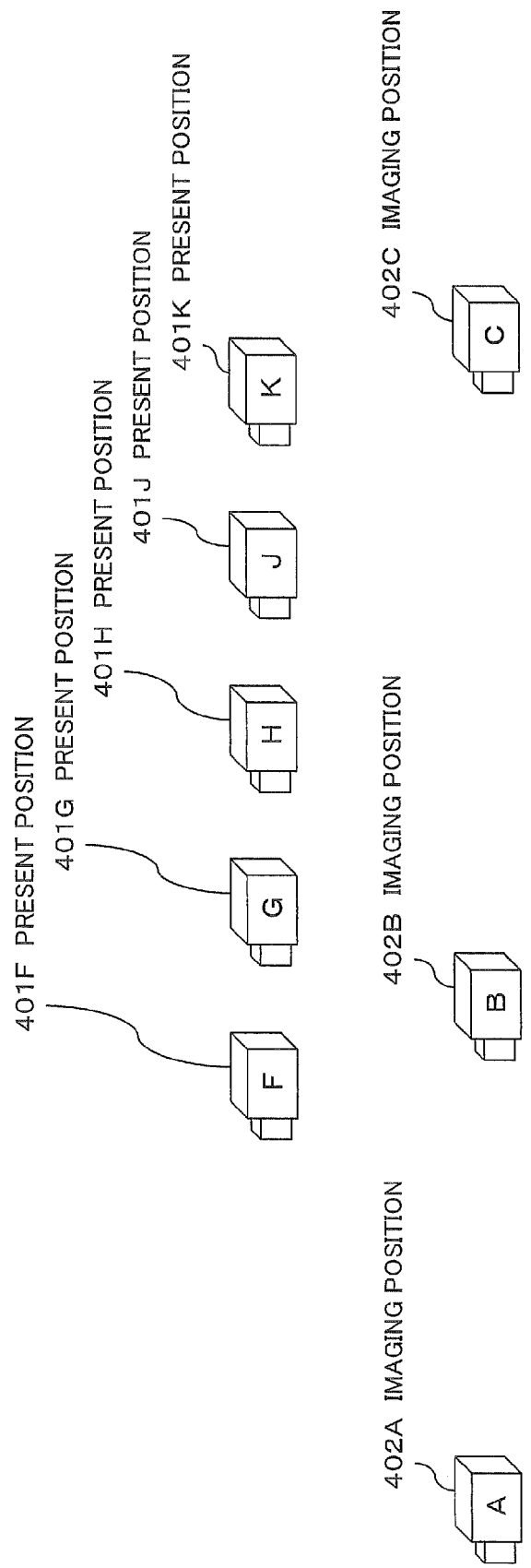
FIG. 13 is a diagram illustrating an example of a movement of a mobile object itself of a second exemplary embodiment.

FIG. 13 is a diagram illustrating an example of movement of the mobile object itself. As shown in FIG. 13, when a present time t is denoted by T, the mobile object itself has moved from a spot denoted by a present imaging position 401K to a spot denoted by a present imaging position 401F during a period covering past five clock times t including a present clock time (clock times T-4, T-3, T-2, T-1 and T). As likewise shown in FIG. 13, positions corresponding to three records 200 which are among the records 200 stored in the scenery image feature database 103, and which have been collated during this period covering the past five time clocks, are candidate imaging positions 402A, 402B and 402C.

At this time, correct anteroposterior relations between the present imaging positions 401F to 401K of the imaging module 101 and the candidate imaging positions 402A to 402C of the respective three records 200 of the scenery image feature database 103 are shown in FIG. 14. FIG. 14 is a diagram illustrating the state changes of relative positions (anterior or posterior) of the present imaging positions 401F to 401K relative to the candidate imaging positions 402A to 402C with respect to the movement of the mobile object itself shown in FIG. 13.

Here, with respect to a relation between a candidate imaging position 402 of a record 200 being stored in the scenery image feature database 103, and having the record number 201 which is denoted by 's', and a present imaging position 401 at a certain clock time which is denoted by 't', a function IsFront (s, t) is defined. Here, any one of the candidate imaging positions 402A to 402C is referred to as the candidate imaging position 402. Further, any one of the present imaging positions 401F to 401K is referred to as the present imaging position 401.

The function IsFront (s, t) returns '1' when the candidate imaging position 402 of the record 200 including the record number 201 denoted by 's' is, in a moving direction, anterior to the present imaging position 401 at the clock time denoted by 't'; while the function IsFront (s, t) returns '0' otherwise.

Further, with respect to a relation between the candidate imaging position 402 of the record 200 being stored in the scenery image feature database 103, and including the record number 201 which is denoted by 's', and the present imaging position 401 at a certain clock time which is denoted by 't', a function IsBack (s, t) is defined. The function IsBack (s, t) returns '1' when the candidate imaging position 402 of the record 200 including the record number 201 denoted by 's' is, in a moving direction, posterior to the present imaging position 401 at a clock time denoted by 't'; while the function IsBack (s, t) returns '0' otherwise.

Here, the record number 201 corresponding to a candidate scenery image having been imaged at the candidate imaging position 402A is denoted by a. Further, the record number 201 corresponding to a candidate scenery image having been imaged at the candidate imaging position 402B is denoted by b. Moreover, the record number 201 corresponding to a candidate scenery image having been imaged at the candidate imaging position 402C is denoted by c.

Based on these definitions, when the relative position calculation module 105 has correctly calculated pieces of relative position information corresponding to the state changes shown in FIG. 13, a relation represented by the following formula (2) is satisfied.

$$\sum_{t=T-4}^{T} IsFront(a, t) + \sum_{t=T-4}^{T-1} IsFront(b, t) + \sum_{t=T}^{T} IsBack(b, t) + \sum_{t=T-4}^{T} IsBack(c, t) = 15 \quad (2)$$

This indicates that the present imaging position exists between the candidate imaging positions 402A and 402B, that is, the present imaging position 401 corresponds to the present imaging position 401F.

The relative position matching determination module 106 determines consistency among pieces of relative position information by using the condition indicated by the formula (2).

That is, when the calculation of, for example, the following formula (3) results in f (a, b, c, t)=15, the relative position matching determination module 106 determines that there is no inconsistency.

$$f(a, b, c, t) = \sum_{t=T-4}^{T} IsFront(a, t) + \sum_{t=T-4}^{T-1} IsFront(b, t) + \sum_{t=T}^{T} IsBack(b, t) + \sum_{t=T-4}^{T} IsBack(c, t) \quad (3)$$

Accordingly, the relative position consistency determination module 106 determines that, at a clock time resulted in f (a, b, c, t)=15, that is, at a clock time when the mobile object itself has just passed a spot corresponding to the candidate imaging position 402B, the consistency among pieces of relative position information has been satisfied. Further, the relative position matching determination module 106 outputs a piece of determinate position information at the clock time.

Moreover, the relative position consistency determination module 106 may allow some cases in each of which anteroposterior relations between the present imaging positions and the candidate imaging positions cannot be calculated correctly because of the influence of moving vehicles, roadside trees, shadow and the like.

In this case, when, as the result of calculating, for example, the following formula (4), the formula (4) is true (satisfied), the relative position consistency determination module 106 determines that there is consistency among pieces of relative position information. In addition, '&' in the formula (4) indicates a logical product operation.

$$\sum_{t=T-4}^{T} IsFront(a, t) \geq 4 \ \& \left( \sum_{t=T-4}^{T-1} IsFront(b, t) + \sum_{t=T}^{T} IsBack(b, t) \geq 4 \right) \& \quad (4)$$
$$\sum_{t=T-4}^{T} IsBack(c, t) \geq 4$$

In this formula (4), so that a calculation result thereof can be true even when any one of the functions IsFront (s, t) and the functions IsBack (s, t) returns '0', a threshold value (for example, '4' in the case of the formula (4)) is set. That is, even when, with respect to each of the records 200 corresponding to the respective candidate imaging positions 402A to 402C, the result of an estimation of an anteroposterior relation with at most one of the present imaging positions is erroneous or uncertain, the relative position consistency determination module 106 determines that there is consistency among pieces of relative position information. The relative position consistency determination module 106 determines that consistency among pieces of relative position information has been satisfied at a clock time when the mobile object itself has passed a spot corresponding to the candidate imaging position 402B.

Moreover, when, as the result of calculating, for example, the following formula (5), the formula (5) is true, the relative position consistency determination module 106 may determine that there is consistency among pieces of relative position information.

$$\sum_{t=T-4}^{T} IsFront(a, t) \geq 4 \& \left( \sum_{t=T-4}^{T-2} IsFront(b, t) + \sum_{t=T-1}^{T} IsBack(b, t) \geq 4 \right) \& \quad (5)$$

$$\sum_{t=T-4}^{T} IsBack(c, t) \geq 4$$

In the case where the presence or absence of consistency is determined by using this formula (5), when the formula (5) has become 'true' at a clock time T, the relative position matching determination module 106 determines that consistency among pieces of relative position information was satisfied at a clock time T-1 which is a time clock backward by one clock time.

Next, operation of this exemplary embodiment will be described in detail with reference to the drawings. FIG. 15 is a flowchart illustrating operation of the positioning apparatus 900 according to this exemplary embodiment.

Since steps S1001 to S1005 are the same as steps S701 to S705 shown in FIG. 7 having been described in the first exemplary embodiment, respectively, description thereof will be omitted.

The relative position result storage module 901 stores therein a piece of relative position information having been outputted by the relative position calculation module 105 (step S1006).

The relative position matching determination module 106 determines the presence or absence of inconsistency on the basis of pieces of relative position information corresponding to a plurality of clock times among the pieces of relative position information stored in the relative position result storage module 901 (step S1007).

If it has been determined that there is inconsistency (Yes in step S1007), the relative position consistency determination module 106 determines that it is impossible to identify a passed-by candidate imaging position at the clock time when the resent scenery image was imaged, and outputs uncertainty information notifying that it is impossible to identify the passed-by candidate imaging position (step S1008). Then, the process flow is terminated.

If it has been determined that there is no inconsistency (No in step S1007), the relative position consistency determination module 106 outputs a piece of determinate position information (step S1009). Then, the process flow is terminated.

A first advantageous effect of the above-described exemplary embodiment is that, besides the advantageous effects of the first exemplary embodiment, it is made possible to output pieces of position information with higher accuracy.

A reason for this is that it is made possible to determine that specific candidate imaging positions were passed by at respective specific clock times by storing pieces of relative position information into the relative position result storage module 901 and collectively determining consistency among pieces of relative position information corresponding to a plurality of clock times.

A second advantageous effect of the above-described exemplary embodiment is that it is made possible to allow an arbitrary degree of inconsistency among pieces of relative position information.

A reason for this is that processing is configured such that pieces of relative position information are stored into the relative position result storage module 901; with respect to pieces of relative position information corresponding to a plurality of clock times, comparisons with corresponding threshold value ranges each allowing some occurrences of an error are performed; and then, the presence or absence of consistency is determined on the basis of the results of these comparisons.

Third Exemplary Embodiment

Next, a third exemplary embodiment will be described in detail with reference to the drawings. Hereinafter, description of the contents overlapping with those of the above-described description will be omitted within a scope which does not make description of this exemplary embodiment unclear.

FIG. 16 is block diagram illustrating a configuration of this third exemplary embodiment. Referring to FIG. 16, this exemplary embodiment includes a movement amount acquisition module 1101 in addition to the configuration of the apparatus, shown in FIG. 12, according to the second exemplary embodiment.

The imaging module 101, the approximate position information calculation module 102, the candidate scenery image data selection module 104, the relative position calculation module 105 and the feature extraction module 115 are completely the same as those of the second exemplary embodiment shown in FIG. 12.

The scenery image feature database 103 stores therein pieces of distance information between mutually adjacent candidate imaging positions in addition to the information, shown in FIG. 3, having been described in the first exemplary embodiment.

The movement amount acquisition module 1101 includes, for example, a vehicle-speed sensor, and calculates and outputs the distance of a movement of the mobile object itself from the last present imaging position at each of present imaging positions. Hereinafter, this calculated distance will be referred to as a movement amount L (t). In addition, 't' is a clock time when a present scenery image is imaged at each of present imaging positions.

In the case where the imaging module 101 images present scenery images with, for example, a video camera outputting a national television system committee (NTSC) signal, L (t) represents the distance of a movement of the mobile object itself for 33 milliseconds.

In addition, L (t) may represent the distance of a movement of the mobile object itself from a second or more present imaging position from the last present imaging position at each of present imaging positions.

The relative position result storage module 901 stores therein L (t) together with the results of calculations at respective present and past clock times, having been performed by the relative position calculation module 105. Moreover, the relative position result storage module 901 stores therein pieces of determinate position information and passage clock times outputted by the relative position consistency determination module 106. This passage clock time is a clock time when the latest present scenery image was imaged, that is, when the relative position consistency determination module 106 determined that the mobile object itself has passed by a spot indicated by a piece of determinate position information (in this case, a certain piece of candidate imaging information).

The relative position matching determination module 106 determines the presence or absence of consistency on the basis of pieces of relative position information corresponding to a plurality of clock times among the pieces of relative position information stored in the relative position result storage module 901, as well as the distance of a movement of the mobile object itself.

Hereinafter, a case where the relative position consistency determination module 106 according to this exemplary embodiment determines the presence or absence of consistency under the state shown in FIG. 13 will be specifically described.

First, a clock time, at which any one of the candidate imaging positions of the records stored in the scenery image feature database 103 (for example, the candidate imaging position 402C) has been passed by, is denoted by a time clock Ta. A distance of the forward movement of the mobile object itself during a period of time from the clock time Ta until a present clock time T (for example, a clock time at which the candidate imaging position 402B was passed by) is represented by the following expression (6).

$$\sum_{t=T_a}^{T} L(t) \qquad (6)$$

The relative position matching determination module 106 calculates the distance of a movement of the mobile object itself by performing arithmetic addition of all the movement amounts L (t) during a period of time from the clock time Ta until the present time T. Next, the relative position matching determination module 106 compares the calculated distance of the movement of the mobile object itself with a distance L (A-B) between the candidate imaging positions 402A and 402B. Next, the relative position matching determination module 106 determines the presence or absence of consistency, including a determination as to whether or not a difference resulting from the comparison is smaller than or equal to a predetermined threshold value 'θ'.

That is, when, as the result of calculation of, for example, the following formula (7), the formula (7) is true, the relative position consistency determination module 106 determines that there is consistency among the piece of relative position information.

$$\sum_{t=T-4}^{T} IsFront(a, t) \geq 4 \ \& \left( \sum_{t=T-4}^{T-2} IsFront(b, t) + \sum_{t=T-1}^{T} IsBack(b, t) \geq 4 \right) \& \qquad (7)$$

$$\sum_{t=T-4}^{T} IsBack(c, t) \geq 4 \ \& \sum_{t=T_a}^{T} L(t) - L(A - B)) \leq \theta$$

In addition, when it has been determined that there is consistency, the relative position consistency determination module 106 stores a piece of position information corresponding to a passed-by candidate imaging position, as well as a piece of information related to a clock time when the candidate imaging position was passed by, into the relative position result storage module 901.

In addition, in the case where an estimated movement-amount error at a clock time T with respect to a movement amount calculated by the movement amount acquisition module 1101 can be estimated as ε (t), 'θ' in the formula (7) may be replaced in accordance with, for example, the following formula (8).

$$\theta = \sum_{t=T_a}^{T} \varepsilon(t) \qquad (8)$$

Next, operation of this exemplary embodiment will be described in detail with reference to the drawing. FIG. 17 is a flowchart illustrating operation of a positioning apparatus 1100 according to this exemplary embodiment.

Since steps S1201 to S1205 are the same as steps S701 to S705 shown in FIG. 7 having been described in the first exemplary embodiment, respectively, description thereof will be omitted.

Next, the movement amount acquisition module 1101 extracts and outputs a movement amount L (t) (step S1206).

The relative position result storage module 901 stores therein pieces of relative position information having been outputted by the relative position calculation module 105, and the movement amount L (t) (step S1207).

The relative position consistency determination module 106 determines the presence or absence of consistency on the basis of pieces of relative position information corresponding to a plurality of clock times among the pieces of relative position information stored in the relative position result storage module 901, as well as the total of movement amounts after an event at which an immediately posterior candidate imaging position was passed by (step S1208).

In the case where there is no inconsistency (NO in step S1208), the process flow proceeds to step S1210.

In contrast, in the case where there is inconsistency (YES in step S1208), the relative position consistency determination module 106 determines that a spot corresponding to a targeted candidate imaging position is not yet been passed by at a present clock time, or indeterminable, and outputs uncertainty information notifying that it is impossible to identify the present position (step S1209). Then, the process flow is terminated.

In step S1210, the relative position consistency determination module 106 outputs a piece of determinate position information (step S1210).

Next, the relative position consistency determination module 106 stores pieces of information, which are related to a candidate imaging position having been passed by and a clock time at which there was passed by, into the relative position result storage module 901 (step S1211).

An advantageous effect of this exemplary embodiment described above is that, besides the advantageous effects of the second exemplary embodiment, it is made possible to further suppress the occurrences of an erroneous determination.

A reason for this is that processing is configured such that the presence or absence of consistency is also determined on the basis of, in addition to pieces of relative position information corresponding to a plurality of clock times, a difference between the movement amounts L (t) having been acquired and a distance between targeted candidate imaging positions.

Each of the components having been described in the above individual exemplary embodiments does not be necessary to be an individually independent existence. With respect to each component, for example, a plurality of components may be realized as one module, and/or one component may be realized by a plurality of modules. Further, each component may be configured such that a certain component is part of another component, and/or part of a certain component and part of another component is overlapped by each other.

Further, although, in each of the exemplary embodiments described above, a plurality of operations are described in order in the form of a flowchart, the description order does not restrict an order in which the plurality of operations are executed. Thus, when practicing each of the exemplary embodiments, it is possible to change the order of the plurality of operations within a scope not causing any content problem.

Moreover, in each of the exemplary embodiments described above, there is no restriction that the plurality of operations must be executed at individually different timing points. For example, during the execution of a certain operation, another operation may occur, and/or an execution timing period of a certain operation and that of another operation may be overlapped by each other partially or entirely.

Moreover, although, in each of the exemplary embodiments described above, there are some descriptions in each of which a certain operation becomes a trigger of another operation, each of the descriptions does not restrict all relations between the certain operation and the another operation. Thus, when practicing each of the exemplary embodiments, it is possible to change the relations among the plurality of operations within a scope not causing any content problem. Further, concrete description of each component's operation does not restrict the component's operation. Thus, when practicing each of the exemplary embodiments, each component's concrete operation may be changed within a scope not causing any problem on the functions, performances, and other characteristics of the exemplary embodiment.

Further, a physical configuration of each component is not restricted to description of the above exemplary embodiments, but may exist independently, may exist so as to be combined with another component, or may be configured so as to be further separated.

Part of or the whole of the above-described exemplary embodiments can be also described just like the following supplementary notes, but is not limited to those.

(Supplementary Note 1) A positioning apparatus including:

an imaging unit that is mounted in a mobile object and images a first scenery image at a first spot where the mobile object exists;

a feature extraction unit that extracts a first image feature from the first scenery image having been imaged by the imaging unit;

an approximate position information acquisition unit that acquires a piece of first position information which is a piece of approximate position information related to the mobile object existing at the first spot;

a scenery image feature storage unit that stores therein a piece of second position information corresponding to each of second spots which are spots on a movement route along which the mobile object is predicted to move, as well as a second image feature of a second scenery image having been imaged in advance at each of the second spots, such that the piece of second position information and the second image feature are correlated with each other;

a candidate scenery image data selection unit that, on the basis of distances between a spot indicated by the piece of first position information and spots indicated by the respective pieces of second position information, selects the plurality pieces of second position information and corresponding the plurality of second image features from inside of the scenery image feature storage unit;

a relative position calculation unit that collates the first image feature with each of the plurality of second image features having been selected by the candidate scenery image data selection unit, and thereby calculates pieces of relative position information between the first spot and the respective second spots corresponding to the selected plurality of second image features; and a relative position consistency determination unit that determines consistency among the plurality pieces of relative position information having been calculated by the relative position calculation unit, and outputs a piece of determinate position information related to the mobile object on the basis of a result of the determination.

(Supplementary Note 2) The positioning apparatus according to supplementary note 1 further including a relative position result storage unit that stores therein the plurality pieces of relative position information having been calculated by the relative position calculation unit, wherein the relative position consistency determination unit outputs a piece of determinate position information corresponding to one of the second spots, by which the mobile object has passed, on the basis of consistency among the stored plurality pieces of relative position information corresponding to a plurality of clock times among clock times at each of which the imaging unit imaged the first scenery image.

(Supplementary Note 3) The positioning apparatus according to supplementary note 2 further including a movement amount acquisition unit that calculates a movement amount of a movement of the mobile object during a period from a clock time at which the imaging unit images a certain kind of the first scenery image until another clock time at which the imaging unit images a different kind of the first scenery image, wherein the relative position consistency determination unit further outputs a passage clock time at which the mobile object has passed by the one of the second spots which is indicated by the piece of determinate position information, wherein the relative position result storage unit further stores therein the movement amount, and the passage clock time which has been outputted by the relative position consistency determination unit, and which corresponds to the piece of determinate position information, and wherein the relative position consistency determination unit outputs a piece of determinate position information corresponding to one of the second spots, by which the moving object has passed, as well as a corresponding passage clock time, on the basis of consistency between an accumulated value resulting from accumulating the movement amount during a period from one of the passage clock times stored in the relative position result storage unit until a present clock time, and a distance between one of the second spots and another one of the second spots, by which the mobile object passed at the one of the passage clock times, the distance being calculated from the pieces of second position information which correspond to the one of the second spots and the another one of the second spots, respectively, and which are stored in the scenery image feature storage unit.

(Supplementary Note 4) The positioning apparatus according to any one of supplementary notes 1 to 3, wherein the plurality of second spots selected by the candidate scenery image data selection unit include one or more of the second spots, which are positioned posterior in a moving direction of the mobile object, and two or more of the second spots, which are positioned anterior in the moving direction thereof.

(Supplementary Note 5) The positioning apparatus according to any one of supplementary notes 1 to 4 further including a candidate scenery image data acquisition unit that acquires the pieces of second position information and the corresponding second image features, both of which have been selected by the candidate scenery image data selection unit, from the scenery image feature storage unit via a network, wherein the scenery image feature storage unit outputs the pieces of second position information and the corresponding second image features to the network.

(Supplementary Note 6) The positioning apparatus according to any one of supplementary notes 1 to 5 further including an image feature acquisition unit that acquires the first image feature, which has been extracted by the feature extraction unit, via a network, wherein the feature extraction unit is mounted in the mobile object and outputs the first image feature to the network.

(Supplementary Note 7) A positioning method for use in a positioning apparatus mounted in a mobile object, the positioning method including:

imaging a first scenery image at a first spot where the mobile object exists;

extracting a first image feature from the first scenery image having been imaged;

acquiring a piece of first position information which is a piece of approximate position information related to the mobile object existing at the first spot;

storing a piece of second position information corresponding to each of second spots which are spots on a movement route along which the mobile object is predicted to move, as well as a second image feature of a second scenery image having been imaged in advance at each of the second spots, into a scenery image feature storage means, such that the piece of second position information and the second image feature are correlated with each other;

on the basis of distances between a spot indicated by the piece of first position information and spots indicated by the respective pieces of second position information, selecting the plurality pieces of second position information and corresponding the plurality of second image features from inside of the scenery image feature storage means;

collating the first image feature with each of the selected plurality of second image features, and thereby calculating pieces of relative position information between the first spot and the respective second spots corresponding to the selected plurality of second image features; and determining consistency among the calculated plurality pieces of relative position information, and outputting a piece of determinate position information related to the mobile object on the basis of a result of the determination.

(Supplementary Note 8) The positioning method according to supplementary note 7, including:

storing the calculated plurality pieces of relative position information into a relative position result storage means; and outputting a piece of determinate position information corresponding to one of the second spots, by which the mobile object has passed, on the basis of consistency among the plurality pieces of relative position information, which are stored in the relative position result storage means, and which correspond to a plurality of clock times among clock times at each of which the first scenery image was imaged.

(Supplementary Note 9) The positioning method according to supplementary note 8, including:

calculating a movement amount of a movement of the mobile object during a period from a clock time at which a certain kind of the first scenery image is imaged until another clock time at which a different kind of the first scenery image is calculated;

storing further the movement amount, as well as a passage clock time, at which the mobile object has passed by the one of the second spots which corresponds to the piece of determinate position information, into the relative position result storage means; and outputting a piece of determinate position information corresponding to one of the second spots, by which the moving object has passed, as well as a corresponding passage clock time, on the basis of consistency between an accumulated value resulting from accumulating the movement amount during a period from one of the passage clock times stored in the relative position result storage means until a present clock time, and a distance between one of the second spots and another one of the second spots, by which the mobile object passed at the one of the passage clock times, the distance being calculated from the pieces of second position information which correspond to the one of the second spots and the another one of the second spots, respectively, and which are stored in the scenery image feature storage means.

(Supplementary Note 10) A nonvolatile medium recording therein a program that causes a computer to execute processing for use in a positioning apparatus mounted in a mobile object, the processing including the processes of:

imaging a first scenery image at a first spot where the mobile object exists extracting a first image feature from the first scenery image having been imaged;

acquiring a piece of first position information which is a piece of approximate position information related to the mobile object existing at the first spot;

storing a piece of second position information corresponding to each of second spots which are spots on a movement route along which the mobile object is predicted to move, as well as a second image feature of a second scenery image having been imaged in advance at each of the second spots, into a scenery image feature storage means, such that the piece of second position information and the second image feature are correlated with each other;

on the basis of distances between a spot indicated by the piece of first position information and spots indicated by the respective pieces of second position information, selecting the plurality pieces of second position information and corresponding the plurality of second image features from inside of the scenery image feature storage means;

collating the first image feature with each of the selected plurality of second image features, and thereby calculating pieces of relative position information between the first spot and the respective second spots corresponding to the selected plurality of second image features; and determining consistency among the calculated plurality pieces of relative position information, and outputting a piece of determinate position information related to the mobile object on the basis of a result of the determination.

(Supplementary Note 11) The nonvolatile medium according to supplementary note 10, which records therein a program that causes a computer to execute processing, the processing including the processes of:

storing the calculated plurality pieces of relative position information into a relative position result storage means; and outputting a piece of determinate position information corresponding to one of the second spots, by which the mobile object has passed, on the basis of consistency among the plurality pieces of relative position information, which are stored in the relative position result storage means, and which correspond to a plurality of clock times among clock times at each of which the first scenery image was imaged.

(Supplementary Note 12) The nonvolatile medium according to supplementary note 11, which records therein a program that causes a computer to execute processing, the processing including the processes of:

calculating a movement amount of a movement of the mobile object during a period from a clock time at which a certain kind of the first scenery image is imaged until another clock time at which a different kind of the first scenery image is calculated;

storing further the movement amount, as well as a passage clock time, at which the mobile object has passed by the one of the second spots which corresponds to the piece of determinate position information, into the relative position result storage means; and outputting a piece of determinate position information corresponding to one of the second spots, by which the moving object has passed, as well as a corresponding passage clock time, on the basis of consistency between an accumulated value resulting from accumulating the movement amount during a period from one of the passage clock times stored in the relative position result storage means until a present clock time, and a distance between one of the second spots and another one of the second spots, by which the mobile object passed at the one of the passage clock times, the distance being calculated from the pieces of second position information which correspond to the one of the second spots and the another one of the second spots, respectively, and which are stored in the scenery image feature storage means.

(Supplementary Note 13) The positioning apparatus according to any one of supplementary notes 1 to 6, wherein the relative position calculation unit calculates a translation matrix on the basis of the first image feature and the plurality of second image features having been selected by the candidate scenery image data selection unit, and calculates pieces of relative position information between the first spot and the respective second spots corresponding to the selected plurality of second image features, on the basis of the calculated translation matrix.

(Supplementary Note 14) The positioning method according to any one of supplementary notes 7 to 9 including:

calculating a translation matrix on the basis of the first image feature and the plurality of second image features having been selected by the candidate scenery image data selection unit, and calculating pieces of relative position information between the first spot and the respective second spots corresponding to the selected plurality of second image features, on the basis of the calculated translation matrix.

(Supplementary Note 15) The nonvolatile medium according to any one of supplementary notes 10 to 12, which records therein a program that causes a computer to execute processing, the processing including the processes of:

calculating a translation matrix on the basis of the first image feature and the plurality of second image features having been selected by the candidate scenery image data selection unit, and calculating pieces of relative position information between the first spot and the respective second spots corresponding to the selected plurality of second image features, on the basis of the calculated translation matrix.

Hereinbefore, the present invention has been described with reference to exemplary embodiments thereof, but the present invention is not limited to these exemplary embodiments. Various changes understandable by the skilled in the art can be made on the configuration and the details of the present invention within the scope of the present invention.

This application is based upon and claims the benefit of priority from Japanese Patent Application No. 2010-282959, filed on Dec. 20, 2010, the disclosure of which is incorporated herein in its entirety by reference.

REFERENCE SIGNS LIST

100 Positioning apparatus
101 Imaging module
102 Approximate position information calculation module
103 Scenery image feature database
104 Candidate scenery image data selection module
105 Relative position calculation module
106 Relative position consistency determination module
115 Feature extraction module
120 Positioning system
121 Mobile object itself
122 Positioning server
123 Present scenery image acquisition module
130 Positioning system
131 Mobile object itself
132 Positioning server
133 Present image feature acquisition module
140 Positioning system
142 Positioning apparatus
143 Candidate scenery image data acquisition module
144 Database server
200 Record
201 Record number
202 Candidate imaging position information
203 Latitude
204 Longitude
205 Feature point information
206 Total feature-point number
207 Coordinate information
208 Feature amount
210 Present image feature
215 Feature point information
217 Coordinate information
218 Feature amount
302 Record selection module
303 Fundamental matrix calculation module
304 Translation and rotation matrix calculation module
305 Anteroposterior position calculation module
401 Present imaging position
401F Present imaging position
401K Present imaging position
402A Candidate imaging position
402B Candidate imaging position
402C Candidate imaging position
801 ECU
802 Camera
803 Hard disk
804 GPS receiver 811 CPU
812 RAM
814 Signal processing circuit
900 Positioning apparatus
901 Relative position result storage module
1100 Positioning apparatus
1101 Movement amount acquisition module

The invention claimed is:

1. A positioning apparatus comprising:
a camera;
a storage device; and
at least one processor that is configured to allow the positioning apparatus to function as:
an imaging unit that is mounted in a mobile object and images a first scenery image at a first spot where said mobile object exists, by use of the camera;
a feature extraction unit that extracts a first image feature from said first scenery image having been imaged by said imaging unit;
an approximate position information acquisition unit that acquires a piece of first position information which is a piece of approximate position information related to said mobile object existing at said first spot;
a scenery image feature storage unit that stores therein, by use of the storage device, a piece of second position information corresponding to each of second spots which are spots on a movement route along which said mobile object is predicted to move, as well as a second image feature of a second scenery image having been imaged in advance at each of said second spots, such that said piece of second position information and said second image feature are correlated with each other;
a candidate scenery image data selection unit that, on a basis of distances between a spot indicated by said piece of first position information and spots indicated by said respective pieces of second position information, selects said plurality pieces of second position information and corresponding said plurality of second image features from said scenery image feature storage unit;
a relative position calculation unit that collates said first image feature with each of said plurality of second image features having been selected by said candidate scenery image data selection unit, and thereby calculates pieces of relative position information between said first spot and said respective second spots corresponding to said selected plurality of second image features;
and a relative position consistency determination unit that determines consistency among said plurality pieces of relative position information having been calculated by said relative position calculation unit, and outputs a piece of determinate position information related to said mobile object on the basis of a result of said determination, each one of the snots being a particular position.

2. The positioning apparatus according to claim 1, wherein
the at least one processor is configured to allow the positioning apparatus further to function as:
a relative position result storage unit that stores therein, by use of the storage device, said plurality pieces of relative position information having been calculated by said relative position calculation unit, and
said relative position consistency determination unit that outputs a piece of determinate position information corresponding to one of said second spots, by which said mobile object has passed, on a basis of consistency among said stored plurality pieces of relative position information corresponding to a plurality of clock times among clock times at each of which said imaging unit imaged said first scenery image.

3. The positioning apparatus according to claim 2, wherein
the at least one processor is configured to allow the positioning apparatus further to function as:
a movement amount acquisition unit that calculates a movement amount of a movement of said mobile object during a period from a clock time at which said imaging unit images a certain kind of said first scenery image until another clock time at which said imaging unit images a different kind of said first scenery image,
said relative position consistency determination unit that further outputs a passage clock time at which said mobile object has passed by said second spot which is indicated by said piece of determinate position information,
said relative position result storage unit that further stores therein, by use of the storage device, said movement amount, and said passage clock time which has been outputted by said relative position consistency determination unit, and which corresponds to said piece of determinate position information, and
said relative position consistency determination unit that outputs a piece of determinate position information corresponding to one of said second spots, by which said moving object has passed, as well as a corresponding passage clock time, on a basis of consistency between an accumulated value resulting from accumulating said movement amount during a period from one of said passage clock times stored in said relative position result storage unit until a present clock time, and a distance between the one of said second spots and another one of said second spots, by which said mobile object passed at the one of said passage clock times, said distance being calculated from said pieces of second position information which correspond to the one of said second spots and the another one of said second spots, respectively, and which are stored in said scenery image feature storage unit.

4. The positioning apparatus according to claim 1, wherein said plurality of second spots selected by said candidate scenery image data selection unit include one or more of said second spots, which are positioned posterior in a moving direction of said mobile object, and two or more of said second spots, which are positioned anterior in said moving direction thereof.

5. The positioning apparatus according to claim 1, wherein
the at least one processor s configured to allow the positioning apparatus further to function as:
a candidate scenery image data acquisition unit that acquires said pieces of second position information and said corresponding second image features, both of which have been selected by said candidate scenery image data selection unit, from said scenery image feature storage unit via a network, and
said scenery image feature storage unit that outputs said pieces of second position information and said corresponding second image features to said network.

6. The positioning apparatus according to claim 1, wherein
the at least one processor is configured to allow the positioning apparatus further to function as:

an image feature acquisition unit that acquires said first image feature, which has been extracted by said feature extraction unit, via a network, and said feature extraction unit that is mounted in said mobile object and outputs said first image feature to said network.

7. A positioning method for use in a positioning apparatus mounted in a mobile object, said positioning method comprising:

imaging a first scenery image at a first spot where said mobile object exists;

extracting a first image feature from said first scenery image having been imaged;

acquiring a piece of first position information which is a piece of approximate position information related to said mobile object existing at said first spot;

storing a piece of second position information corresponding to each of second spots which are spots on a movement route along which said mobile object is predicted to move, as well as a second image feature of a second scenery image having been imaged in advance at each of said second spots, into scenery image feature storage means, such that said piece of second position information and said second image feature are correlated with each other;

on a basis of distances between a spot indicated by said piece of first position information and spots indicated by said respective pieces of second position information, selecting said plurality pieces of second position information and corresponding said plurality of second image features from inside of said scenery image feature storage means;

collating said first image feature with each of said selected plurality of second image features, and thereby calculating pieces of relative position information between said first spot and said respective second spots corresponding to said selected plurality of second image features; and determining consistency among said calculated plurality pieces of relative position information, and outputting a piece of determinate position information related to said mobile object on the basis of a result of said determination.

8. The positioning method according to claim 7, further comprising:

storing said calculated plurality pieces of relative position information into relative position result storage means; and outputting a piece of determinate position information corresponding to one of said second spots, by which said mobile object has passed, on a basis of consistency among said plurality pieces of relative position information, which are stored in said relative position result storage means, and which correspond to a plurality of clock times among clock times at each of which said first scenery image was imaged.

9. The positioning method according to claim 8, further comprising:

calculating a movement amount of a movement of said mobile object during a period from a clock time at which a certain kind of said first scenery image is imaged until another clock time at which a different kind of said first scenery image is calculated;

storing further said movement amount, as well as a passage clock time, at which said mobile object has passed by said one of said second spots which corresponds to said piece of determinate position information, into said relative position result storage means; and outputting a piece of determinate position information corresponding to one of said second spots, by which said moving object has passed, as well as a corresponding passage clock time, on a basis of consistency between an accumulated value resulting from accumulating said movement amount during a period from one of said passage clock times stored in said relative position result storage means until a present clock time, and a distance between one of said second spots and another one of said second spots, by which said mobile object passed at the one of said passage clock times, said distance being calculated from said pieces of second position information which correspond to the one of said second spots and the another one of said second spots, respectively, and Which are stored in said scenery image feature storage means.

10. A non-transitory computer readable medium storing therein a program that causes a computer to execute processing for use in a positioning apparatus mounted in a mobile object, said processing comprising the processes of:

imaging a first scenery image at a first spot where said mobile object exists;

extracting a first image feature from said first scenery image having been imaged;

acquiring a piece of first position information which is a piece of approximate position information related to said mobile object existing at said first spot;

storing a piece of second position information corresponding to each of second spots which are spots on a movement route along which said mobile object is predicted to move, as well as a second image feature of a second scenery image having been imaged in advance at each of said second spots, into scenery image feature storage, such that said piece of second position information and said second image feature are correlated with each other;

on a basis of distances between a spot indicated by said piece of first position information and spots indicated by said respective pieces of second position information, selecting said plurality pieces of second position information and corresponding said plurality of second image features from inside of said scenery image feature storage;

collating said first image feature with each of said selected plurality of second image features, and thereby calculating pieces of relative position information between said first spot and said respective second spots corresponding to said selected plurality of second image features; and determining consistency among said calculated plurality pieces of relative position information, and outputting a piece of determinate position information related to said mobile object on a basis of a result of said determination, each one of the spots being a particular position.

11. The non-transitory computer readable medium according to claim 10, said processing including the processes of:

storing said calculated plurality pieces of relative position information into a relative position result storage; and outputting a piece of determinate position information corresponding to one of said second spots, by which said mobile object has passed, on basis of consistency among said plurality pieces of relative position information, which are stored in said relative position result storage, and which correspond to a plurality of clock times among clock times at each of which said first scenery image was imaged.

12. The non-transitory computer readable medium according to claim 11, said processing including the processes of:
calculating a movement amount of a movement of said mobile object during a period from a clock time at which a certain kind of said first scenery image is imaged until another clock time at which a different kind of said first scenery image is calculated;
storing further said movement amount, as well as a passage clock time, at which said mobile object has passed by said one of said second spots which corresponds to said piece of determinate position information, into said relative position result storage; and
outputting a piece of determinate position information corresponding to one of said second spots, by which said moving object has passed, as well as a corresponding passage clock time, on a basis of consistency between an accumulated value resulting from accumulating said movement amount during a period from one of said passage clock times stored in said relative position result storage until a present clock time, and a distance between one of said second spots and another one of said second spots, by which said mobile object passed at the one of said passage clock times, said distance being calculated from said pieces of second position information which correspond to the one of said second spots and the another one of said second spots, respectively, and which are stored in said scenery image feature storage.

13. The positioning apparatus according to claim 1, wherein
the at least one processor is configured to allow the positioning apparatus further to function as:
said relative position calculation unit that calculates a translation matrix on a basis of said first image feature and said plurality of second image features having been selected by said candidate scenery image data selection unit, and calculates pieces of relative position information between said first spot and said respective second spots corresponding to the selected plurality of second image features, on the basis of said calculated translation matrix.

14. The positioning method according to claim 7 including:
calculating a translation matrix on the basis of said first image feature and said plurality of second image features having been selected by said candidate scenery image data selection unit, and calculating pieces of relative position information between said first spot and said respective second spots corresponding to said selected plurality of second image features, on the basis of said calculated translation matrix.

15. The non-transitory computer readable medium according to claim 10, said processing including the processes of:
calculating a translation matrix on the basis of said first image feature and said plurality of second image features having been selected by said candidate scenery image data selection unit, and calculating pieces of relative position information between said first spot and said respective second spots corresponding to said selected plurality of second image features, on the basis of said calculated translation matrix.

16. The positioning apparatus according to claim 1, wherein the storage device comprises a non-transitory computer readable medium.

17. The positioning apparatus according to claim 1, wherein the storage device comprises a non-transitory computer readable medium storing a program, the at least one processor executing the program to configure the imaging unit, feature extraction unit, scenery image feature storage unit, candidate scenery image data selection unit, relative position calculation unit, and relative position consistency determination unit.

18. The positioning method according to claim 7, wherein the scenery image feature storage means comprises a non-transitory computer readable medium.

19. The positioning method according to claim 8, wherein the scenery image feature storage means comprises a non-transitory computer readable medium, and
wherein the relative position result storage means comprises the non-transitory computer readable medium.

20. The positioning apparatus according to claim 1, wherein the first spot is a location where said mobile object exists, and
wherein the second spots are particular positions on a movement route along which said mobile object is predicted to move.

* * * * *